US011356418B2

(12) United States Patent
Singh et al.

(10) Patent No.: US 11,356,418 B2
(45) Date of Patent: Jun. 7, 2022

(54) SYSTEMS AND METHODS FOR USING UNENCRYPTED COMMUNICATION TUNNELS

(71) Applicant: Citrix Systems, Inc., Fort Lauderdale, FL (US)

(72) Inventors: Raghavendra Singh, Bengaluru (IN); Praveen Raja Dhanabalan, Bengaluru (IN); Jagan Mohana Rao Arisankala, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 41 days.

(21) Appl. No.: 16/898,822

(22) Filed: Jun. 11, 2020

(65) Prior Publication Data
US 2021/0352047 A1 Nov. 11, 2021

(30) Foreign Application Priority Data
May 7, 2020 (IN) .............................. 202041019396

(51) Int. Cl.
*H04L 61/2575* (2022.01)
*H04L 61/2514* (2022.01)
*H04L 9/40* (2022.01)

(52) U.S. Cl.
CPC ...... *H04L 63/0272* (2013.01); *H04L 61/2514* (2013.01); *H04L 61/2575* (2013.01); *H04L 63/029* (2013.01); *H04L 63/0428* (2013.01)

(58) Field of Classification Search
CPC .................................................. H04L 63/0272
See application file for complete search history.

(56) References Cited

U.S. PATENT DOCUMENTS

| 7,093,283 B1 * | 8/2006 | Chen ..................... H04L 63/104 709/242 |
| 2020/0186507 A1 * | 6/2020 | Dhanabalan ........ H04L 63/0272 |

* cited by examiner

*Primary Examiner* — Zhensheng Zhang
(74) *Attorney, Agent, or Firm* — Foley & Lardner LLP

(57) ABSTRACT

Described embodiments provide systems and methods for using unencrypted communication tunnels. A first device intermediary between a client and a server may maintain an encrypted tunnel and an unencrypted tunnel with a second device intermediary between the client and the server. The first device may communicate, with the second device, at least one network address translation (NAT) rule via the encrypted tunnel. The first device may translate address information of a first packet, using the at least one NAT rule. The first device may send the first packet with the translated address information via the unencrypted tunnel, to the second device to reverse the translation of the address information using the at least one NAT rule.

20 Claims, 13 Drawing Sheets

SYSTEMS AND METHODS FOR USING UNENCRYPTED COMMUNICATION TUNNELS

CROSS-REFERENCE TO RELATED APPLICATIONS

The present application claims the benefit of and priority to Indian Provisional Patent Application No. 202041019396, entitled "SYSTEMS AND METHODS FOR USING UNENCRYPTED COMMUNICATION TUNNELS," filed May 7, 2020, the entirety of which is incorporated by reference herein.

FIELD OF THE DISCLOSURE

The present application generally relates to communications of data, including but not limited to systems and methods for using unencrypted communication tunnels.

BACKGROUND

Network nodes may communicate and exchange data with one another across a public network, such as the Internet. A private network may be established between participant network nodes over the public network to limit the visibility of the exchanged data to non-participant network nodes.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

A virtual private network (VPN) may be established over a public network to extend a private network of an enterprise over the public network by encrypting data across the endpoints in the VPN. For example, the VPN may be set up among network devices in accordance with an Internet Protocol Security (IPsec) protocol over the Internet to provide secure, encrypted communications among the network devices. While secure communications over a public network may be achieved, the establishment and maintenance of the VPN may incur larger burdens in the form of additional headers on transmission packets. The addition of these headers and other data may consume more computational and network resources, thus inducing greater latency for the network devices.

To establish and manager an IPSec tunnel, the overhead involved may consume a significant amount of computing and network resources. For example, to transmit 1 byte of data for Telnet or Secure Shell (SSH) applications: (i) 15 bytes may be added for Advanced Encryption Standard (AES) padding to reach 16 byte AES block size (one 16 byte block); (ii) 1 bit is added for the padding identifier; (iii) 8 bytes may be added for Secure Hash Algorithm 1 (SHA-1) message length information; (iv) 39 bytes may be added for 7 bit padding to arrive at the 64 byte SHA-1 block site (one 64 byte block); (v) 20 bytes may be added for Encapsulating Security Payload (ESP) tunnel mode header; (vi) 8 bytes may be for the ESP header; and (vii) 16 bytes for the ESP initialization vector (IV); and (vii) 16 bytes may be added for the ESP trailer. All in all, extra 124 bytes per packet may lead to a 12,300% increase in the overhead per packet.

While other applications may have lower overhead, the increase in the overhead may be non-negligible and noticeably considerable as a drain on network resources. For example, to transmit 1460 bytes of data for file transfer: (i) 8 bytes may be added for AES padding to reach the 16 byte AES block size (63 16 byte blocks); (ii) 1 bit may be added for the padding identifier; (iii) 8 bytes may be added for the SHA-1 message length information; (iv) 7 bytes, 7 bits padding may be added to reach the 64 byte SHA-1 block size (16 64 Byte blocks); (v) 20 bytes may be added for the ESP tunnel mode header; (vi) 8 bytes may be added for the ESP header; (vii) 16 bytes may be added for the ESP IV; and (viii) 16 bytes may be added for the ESP trailer. In total, 84 bytes are added for each packet, yielding a 8.4% increase in the overhead per packet.

With the inclusion of intermediary devices between communicating network nodes (e.g., a client at a branch office and a server at a datacenter), the increase to the overhead to the packets may be exacerbated. As the packets travel from the source node (e.g., the client) to the destination node (e.g., the server), each intermediary device may re-encrypt and add more overhead to the packets. This may result in an exponential increase in the overhead in each packet at each intermediary device. Moreover, once the packet arrives at the intended destination, the destination node may again process the overhead and repeatedly decrypt the contents of the packet to recover the original data, thus leading to a higher use of computing resources.

In order to address the challenges with increased overhead from maintaining communication tunnels, the capabilities of applications in performing the initial encryption on data to be communicated through an insecure network may be leveraged. A client-side intermediary device and a server-side intermediary device may establish a set of one or more unencrypted tunnels and a set of one or more encrypted tunnels over a public network. The encrypted tunnel(s) may carry traffic with packets encrypted at one of the intermediary devices. Conversely, the unencrypted tunnel(s) may carry traffic with packets communicated from the client or the server, without additional encryption applied to the packets.

To establish a connection with the server, the client may send a handshake message (e.g., a client hello message) to the server via the client-side intermediary device and initiate a handshake protocol with the server through the server-side intermediary device. The client-side and the server-side intermediary devices may forward the handshake packets exchanged between the client and the server over one of the encrypted tunnel(s). As the handshake process is performed, the intermediary device (the client-side or the server-side) may parse the client hello message and the server hello message to identify the cipher suite. Once the handshake process is successful, the intermediary devices may receive and store the communicated cipher suites.

With the identification of cipher suite, the intermediary device may determine whether the cipher suite is of sufficient strength. For example, the intermediary device may map the cipher suite with a list of cipher suites identified as of sufficient strength. If the cipher suite is determined to not be sufficiently strong, the intermediary device may continue using the encrypted tunnel to communicate the packets between the client and the server. The supposition may be that the packets encrypted in accordance with the insufficiently strong cipher suite may be vulnerable and may present a security risk.

On the other hand, if the cipher suite is determined to be sufficiently strong, the intermediary device may use one of the unencrypted tunnels to communicate the packets. The assumption may be that the encryption applied to the data may be trusted with sufficiently strong encryption keys. In conjunction, the intermediary device may provide source and destination network address translation (NAT) rules to the other intermediary device. Each NAT rule may define a mapping for changing source and destination addresses. Multiple NAT rules may be provided for multiple connections. Prior to communicating through the unencrypted tunnel, the intermediary device may apply the source and destination NAT rule to address information in the packets to translate the address information. Once translated, the intermediary device may send the packets through the unencrypted channel. When the packets are received, the recipient intermediary device may apply the NAT rule to recover the original source and destination addresses in the packets, to route the packets to the intended destination.

The intermediary device may reliably deliver network traffic between sites in enterprise network by sending the packets over an encrypted tunnel that is established between datacenter and branch sites. As most of the traffic generated by either end encrypts the payload prior to transmission, the intermediary device may rely on the strong encryption already applied by the originating application. In this manner, the intermediary device may for instance save around 50 to 100 bytes of additional encryption per each packet. The client, the server, and the intermediary devices may reduce the consumption of computing resources from avoiding re-encryption. Furthermore, since the amount of overhead is reduced, utilization of network bandwidth may be decreased. As a result, the amount of latency from the transit of the packet between the client and the server may be lessened.

At least one aspect is directed to a method of using unencrypted communication tunnels. A first device intermediary between a client and a server may maintain an encrypted tunnel and an unencrypted tunnel with a second device intermediary between the client and the server. The first device may communicate, with the second device, at least one network address translation (NAT) rule via the encrypted tunnel. The first device may translate address information of a first packet, using the at least one NAT rule. The first device may send the first packet with the translated address information via the unencrypted tunnel, to the second device to reverse the translation of the address information using the at least one NAT rule.

In some embodiments, the first device may establish the encrypted tunnel and the unencrypted tunnel with the second device. In some embodiments, the first device may receive a handshake message from the client or the server for establishing a connection to communicate at least the first packet between the client and the server. In some embodiments, the first device may determine, according to information from the handshake message, that encryption applied by the client or the server on at least the first packet would meet a predetermined threshold. In some embodiments, the first device may send, responsive to the determining, the first packet via the unencrypted tunnel to the second device.

In some embodiments, the first device may receive a handshake message from the client or the server for establishing a connection between the client and the server. In some embodiments, the first device may send the handshake message to the second device via the encrypted tunnel.

In some embodiments, communicating the at least one NAT rule via the encrypted tunnel may include encrypting the at least one NAT rule prior to sending to the second device. In some embodiments, communicating the at least one NAT rule via the encrypted tunnel may include causing the second device to decrypt the encrypted at least one NAT rule. In some embodiments, the address information of the first packet may include at least one of a source address, a source port, a destination address, or a destination port.

In some embodiments, at least the first device may maintain the at least one NAT rule until a timeout event or a connection between the client and the server becomes inactive. In some embodiments, the first device may communicate, with the second device, a plurality of NAT rules for a plurality of connections between at least the client and at least the server, in a packet via the encrypted tunnel.

At least one aspect is directed to a first device for using unencrypted communication tunnels. The first device may include at least one processor that is intermediary between a client and a server. The at least one processor may maintain an encrypted tunnel and an unencrypted tunnel with a second device intermediary between the client and the server. The at least one processor may communicate, with the second device, at least one network address translation (NAT) rule via the encrypted tunnel. The at least one processor may translate address information of a first packet, using the at least one NAT rule. The at least one processor may send the first packet with the translated address information via the unencrypted tunnel, to the second device to reverse the translation of the address information using the at least one NAT rule.

In some embodiments, the at least one processor may establish the encrypted tunnel and the unencrypted tunnel with the second device. In some embodiments, the at least one processor may receive a handshake message from the client or the server for establishing a connection to communicate at least the first packet between the client and the server. In some embodiments, the at least one processor may determine, according to information from the handshake message, that encryption applied by the client or the server on at least the first packet would meet a predetermined threshold. In some embodiments, the at least one processor may send, responsive to the determination, the first packet via the unencrypted tunnel to the second device.

In some embodiments, the at least one processor is configured to communicate the at least one NAT rule via the encrypted tunnel by encrypting the at least one NAT rule prior to sending to the second device. In some embodiments, the at least one processor is configured to communicate the at least one NAT rule via the encrypted tunnel by causing the second device to decrypt the encrypted at least one NAT rule.

In some embodiments, the address information of the first packet may include at least one of a source address, a source port, a destination address, or a destination port. In some embodiments, the at least one processor is configured to maintain the at least one NAT rule until a timeout event or a connection between the client and the server becomes inactive. In some embodiments, the at least one processor may communicate, with the second device, a plurality of NAT rules for a plurality of connections between at least the client and at least the server, in a packet via the encrypted tunnel.

At least one aspect is directed to a non-transitory computer readable medium storing program instructions. The instructions may cause at least one processor to maintain an encrypted tunnel and an unencrypted tunnel with a second device intermediary between a client and a server. The at least one processor may reside in a first device intermediary between the client and the server. The instructions may cause at least one processor to communicate, with the second device, at least one network address translation (NAT) rule via the encrypted tunnel. The instructions may cause at least one processor to translate address information of a first packet, using the at least one NAT rule. The instructions may cause at least one processor to send the first packet with the translated address information via the unencrypted tunnel to the second device to reverse the translation of the address information at the second device using the at least one NAT rule.

In some embodiments, the instructions may cause at least one processor to receive a handshake message from the client or the server for establishing a connection to communicate at least the first packet between the client and the server. In some embodiments, the instructions may cause at least one processor to determine, according to information from the handshake message, that encryption applied by the client or the server on at least the first packet would meet a predetermined threshold. In some embodiments, the instructions may cause at least one processor to send, responsive to the determination, the first packet via the unencrypted tunnel to the second device.

In some embodiments, the instructions may cause at least one processor to receive a handshake message from the client or the server for establishing a connection between the client and the server. In some embodiments, the instructions may cause at least one processor to send the handshake message to the second device via the encrypted tunnel. In some embodiments, the instructions may cause at least one processor to communicate the at least one NAT rule via the encrypted tunnel by encrypting the at least one NAT rule prior to sending to the second device. In some embodiments, the instructions may cause at least one processor to communicate the at least one NAT rule via the encrypted tunnel by causing the second device to decrypt the encrypted at least one NAT rule.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
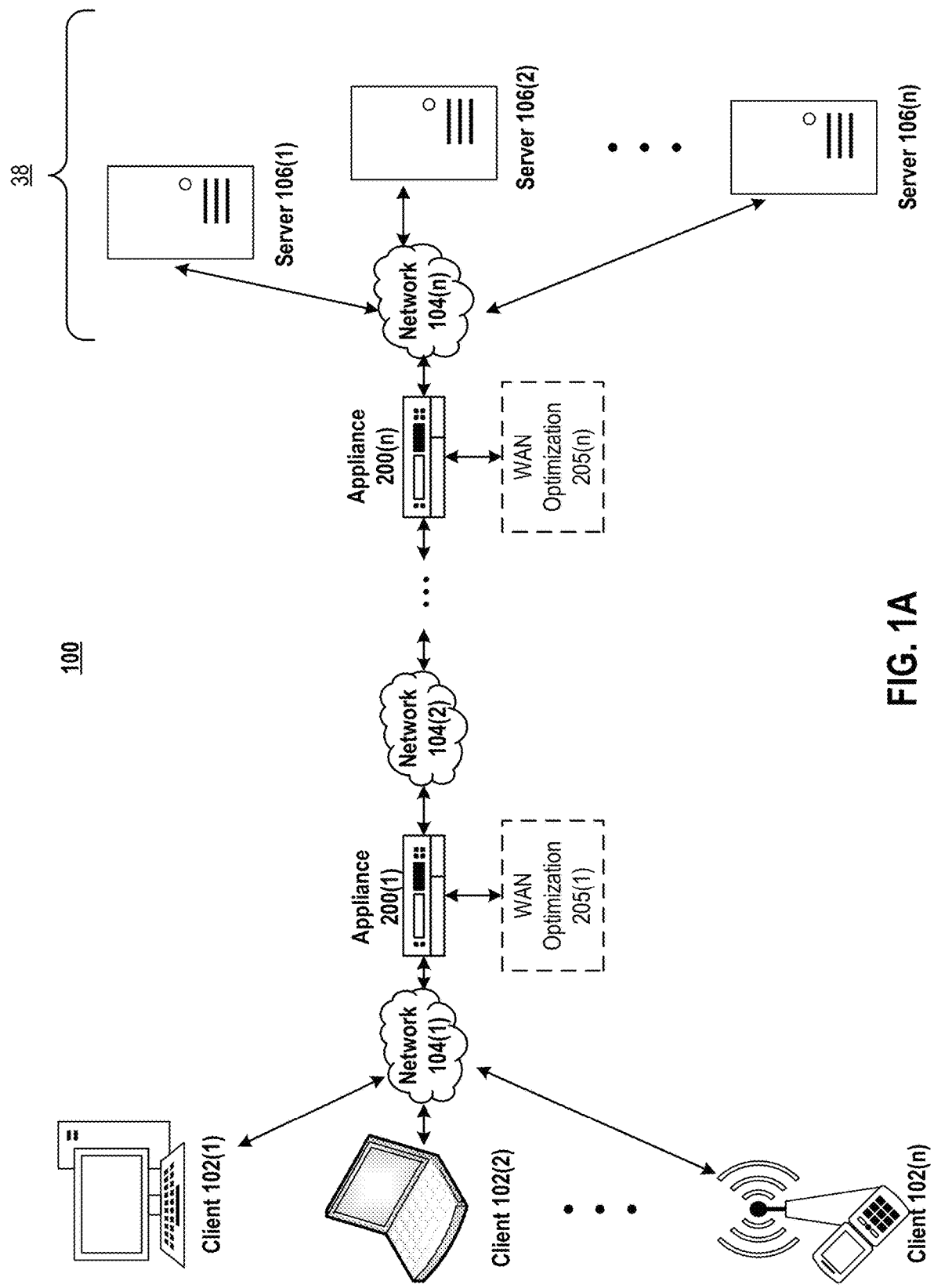
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment;

Section E describes embodiments of systems and methods for selective encryption of tunneled encrypted traffic; and Section F describes embodiments of systems and methods for using unencrypted communication tunnels.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
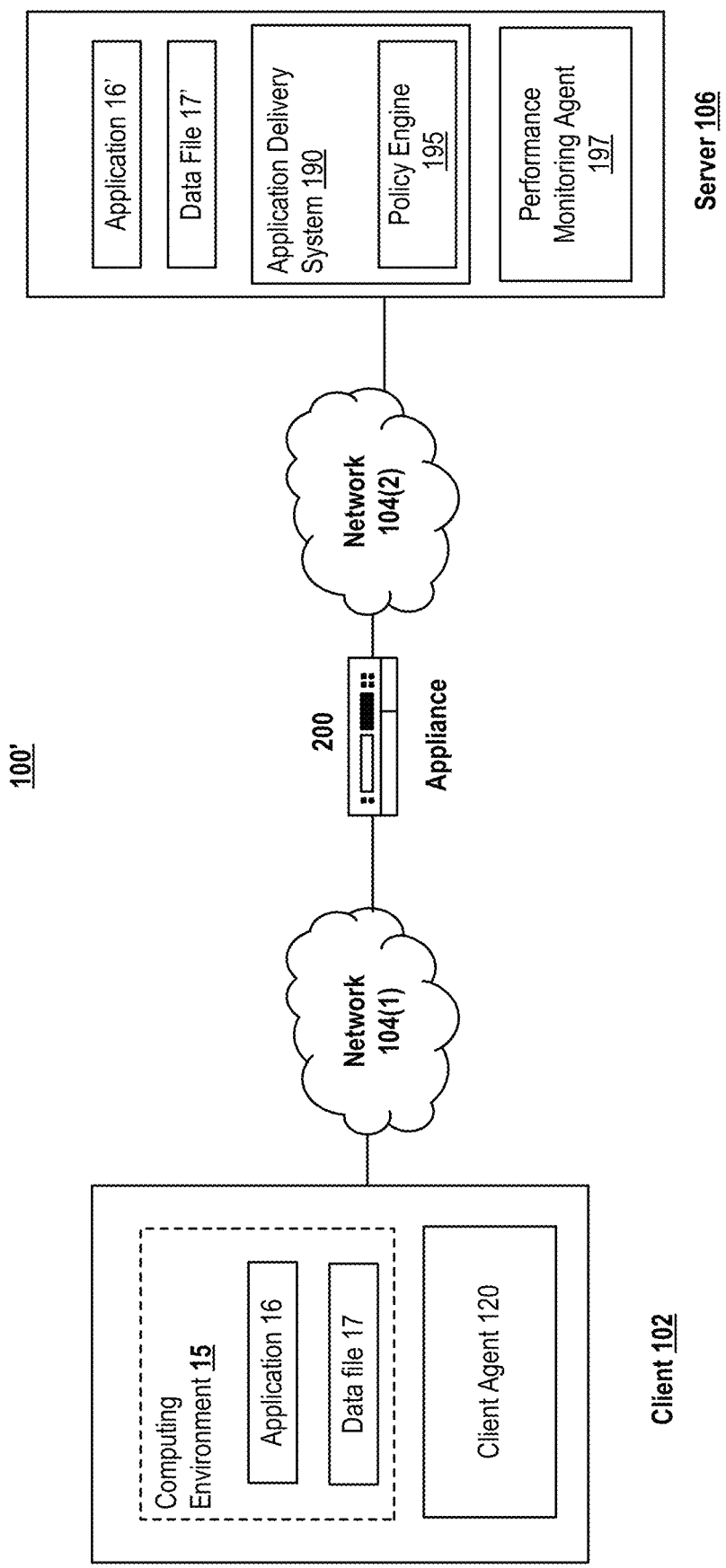
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
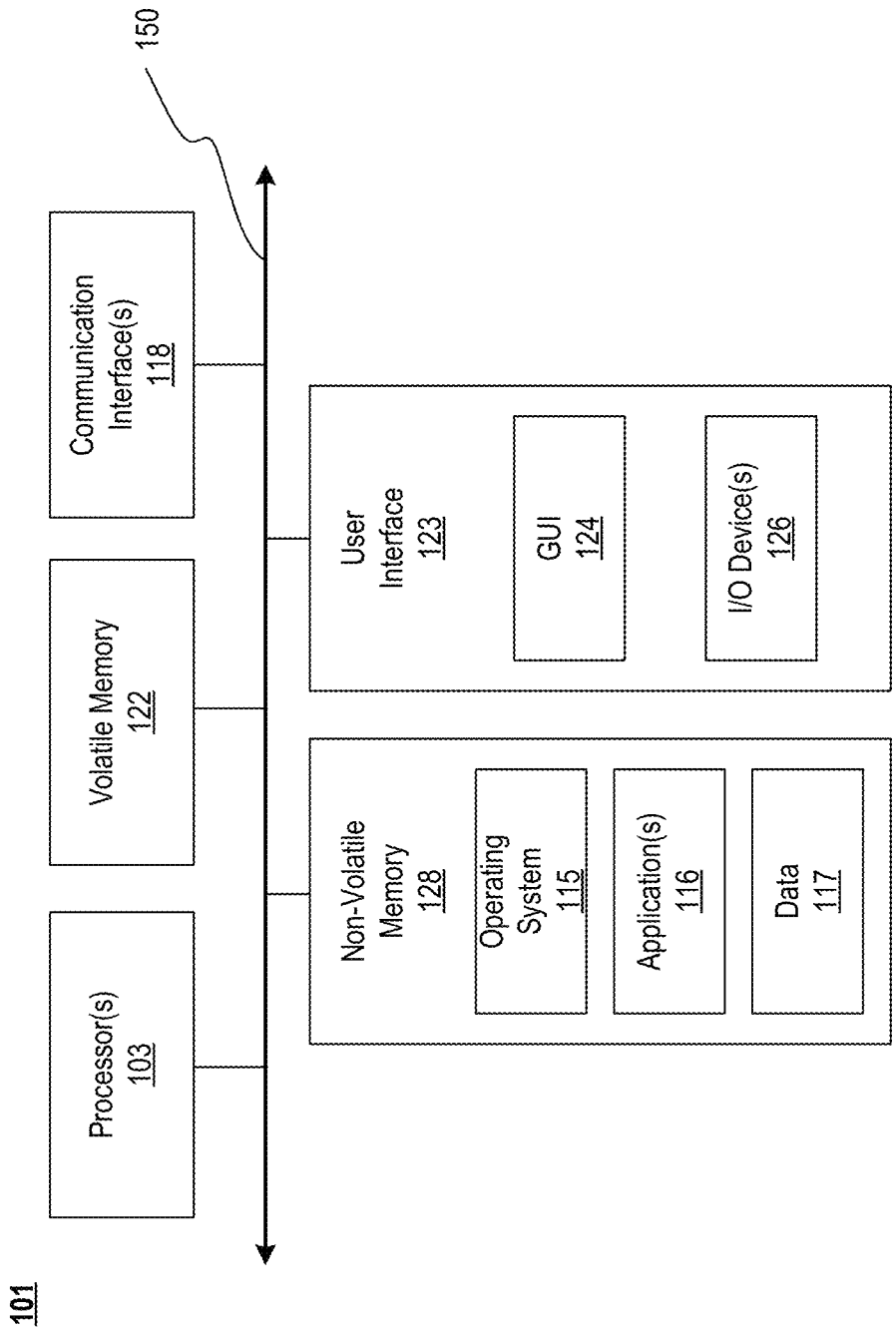
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
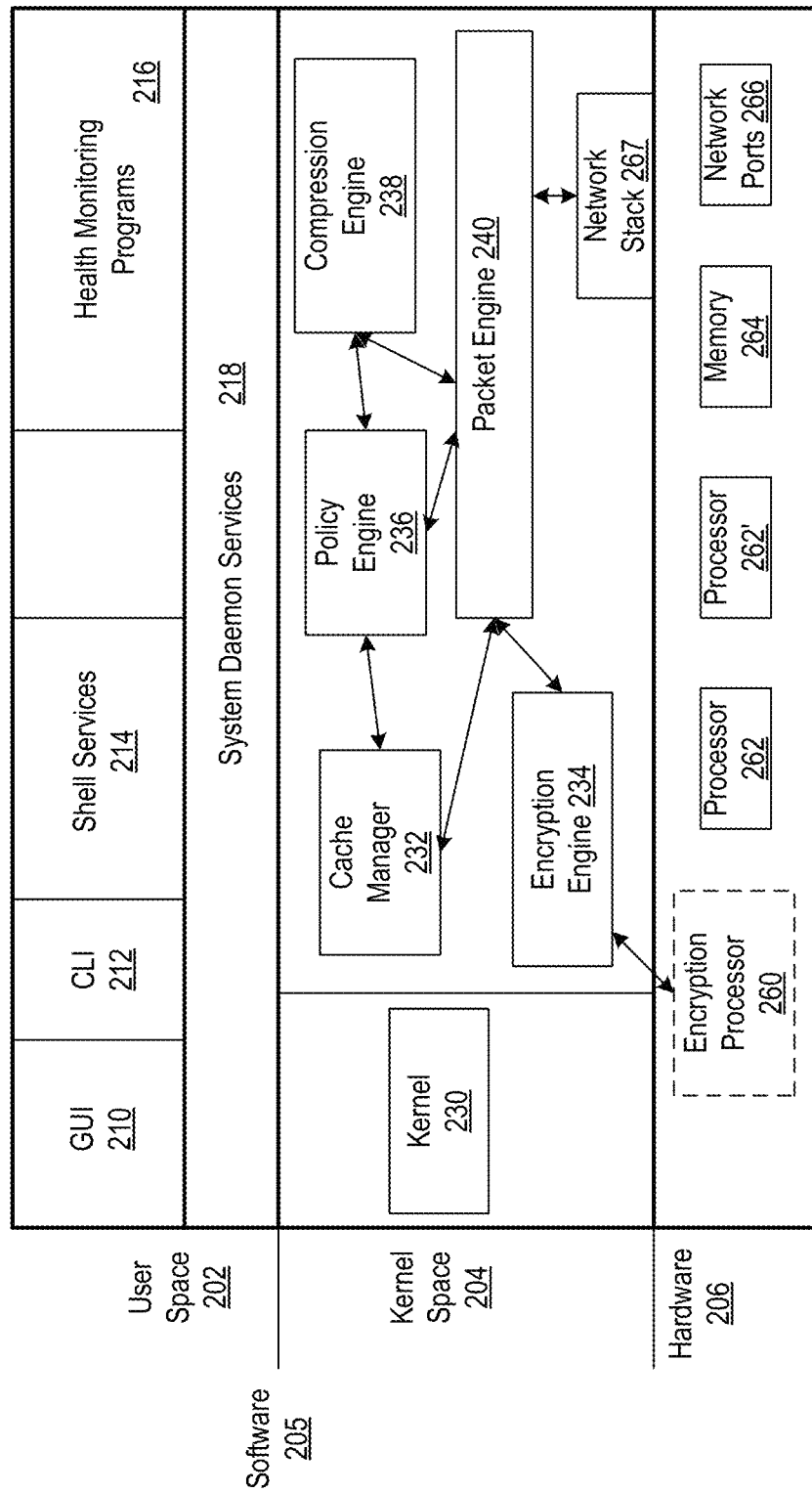
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications.

For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
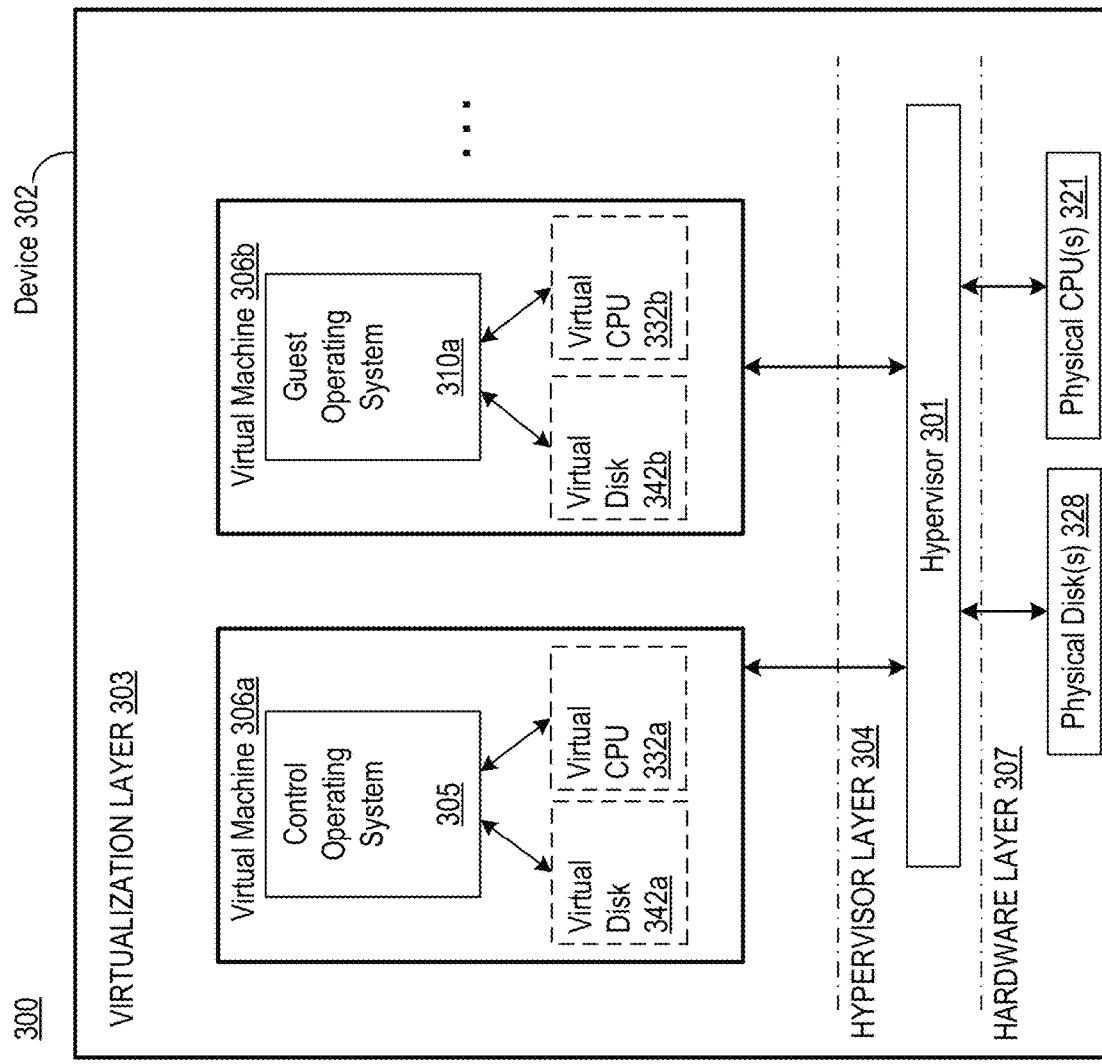
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
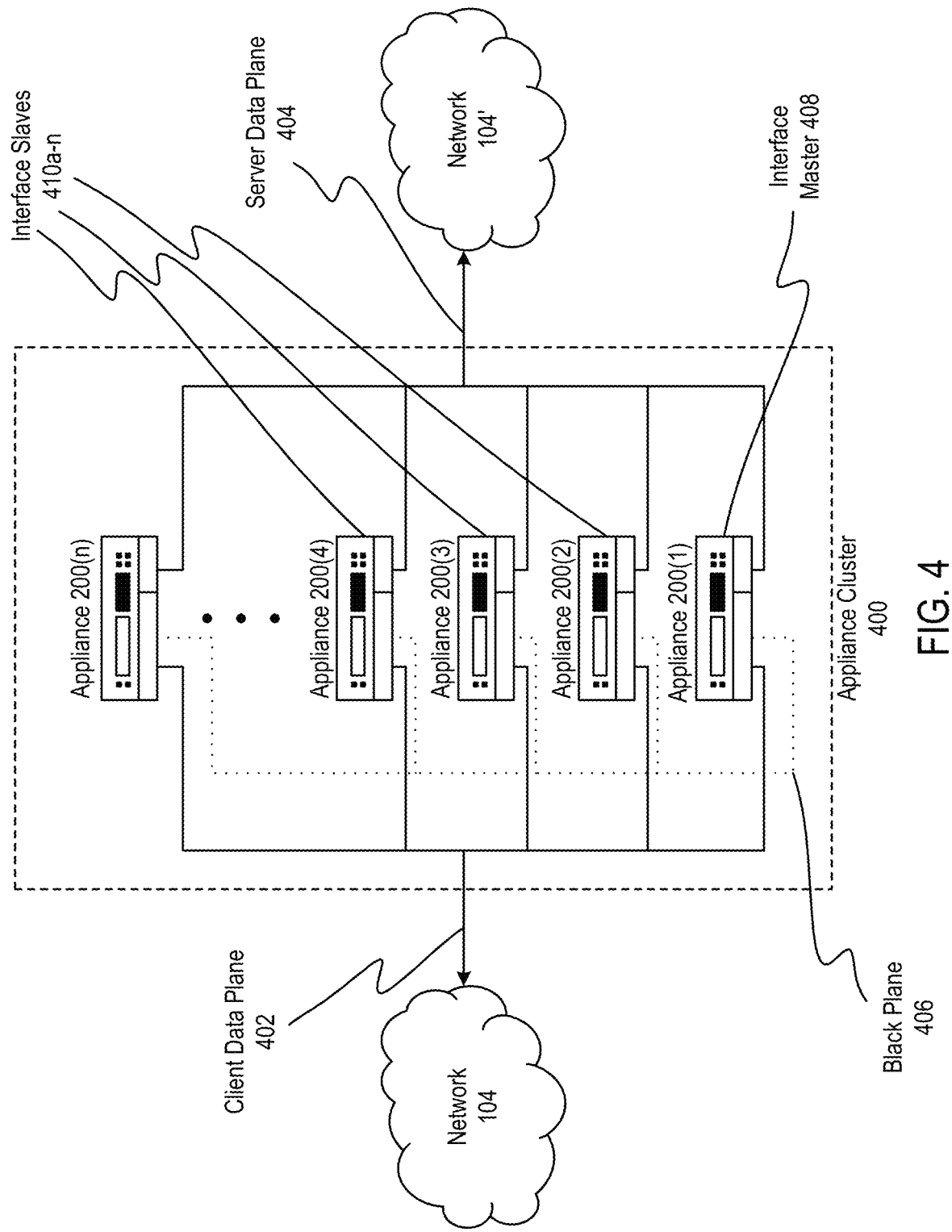
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Systems and Methods for Selective Encryption of Tunneled Encrypted Traffic

The following disclosure is directed to systems and methods for selective encryption of tunneled traffic. Various intermediary or other network devices may be arranged, located, or otherwise situated between senders and receivers of data (e.g., clients and servers, for instance). In a SD-WAN environment, network traffic may be delivered between physical and virtual sites using a combination of virtual network tunnels and identification and classification of applications and network protocols. The virtual network tunnels may use multiple underlying network connections and may be encrypted to provide privacy and security Most payload data may be encrypted by the sender. However, encryption algorithm header information and/or initial phases of the protocol exchange may not be encrypted. Such embodiments may expose data to potential interception. According to the improvements described herein, the systems and methods described herein may selectively encrypt portions of network traffic based on the encryption protocols used by the sender. For instance, where a sender sends packets for known protocols utilizing strong encryption, an intermediary device may encrypt initial protocol exchange packets and/or the plain text header information, but not "double encrypt" the payload data. To double encrypt, or apply another layer of encryption over an encrypted payload data would consume significant processing resources, and can reduce the throughput of an SD-WAN device for instance, which is inefficient and redundant if the existing encryption is sufficient strong to ensure privacy and/or security. The embodiments described herein may selectively encrypt portion(s) of the network traffic that is determined to be insufficiently protected (e.g., by encryption, or according to the trustworthiness of the source application or user), or having a significant likelihood that these may be insufficiently protected. Hence, by identifying portion(s) of the network traffic to perform encryption while bypassing encryption on other portions (which can be significantly more than, such as multiple times in size as compared to) the former, the present systems and methods can reduce processing overhead and/or latency, and increase the throughput of the intermediary device, by avoiding unnecessary encryption of the already encrypted portions of the network traffic (e.g., the payload data).

In some implementations, a first device (which may be intermediary to senders and receivers, such as an SD-WAN device) may identify a protocol used by a network flow traversing the first device via one or more packets of the protocol. The first device may determine (e.g., based on the protocol) that a level of encryption for the network flow meets a predetermined threshold. The first device may receive network packet(s) to be communicated between a sender and receiver. The network packet(s) may include an encrypted portion (e.g., a first portion) and a clear text or unencrypted portion (e.g., a second portion having clear text information). The first device may encrypt the second, clear text portion. The first device may forward the network packet(s) with both portions encrypted, via a tunnel to a second device for decryption and forwarding to the receiver.

According to the embodiments described herein, rather than performing encryption on all packets, the systems and methods described herein may selectively encrypt portions (e.g., unencrypted or clear text portions) of packets. Instead of encrypting all packets and for all bytes in each packet, it may be possible to increase network traffic throughput by identifying portions of packets that are already strongly encrypted, and forwarding such packets without additional encryption. In an SD-WAN implementation for instance, various intermediary devices may be suitable for such selective encryption, as such intermediary devices may be implemented to perform packet inspection and application classification as part of their functionality.

Figure 5:
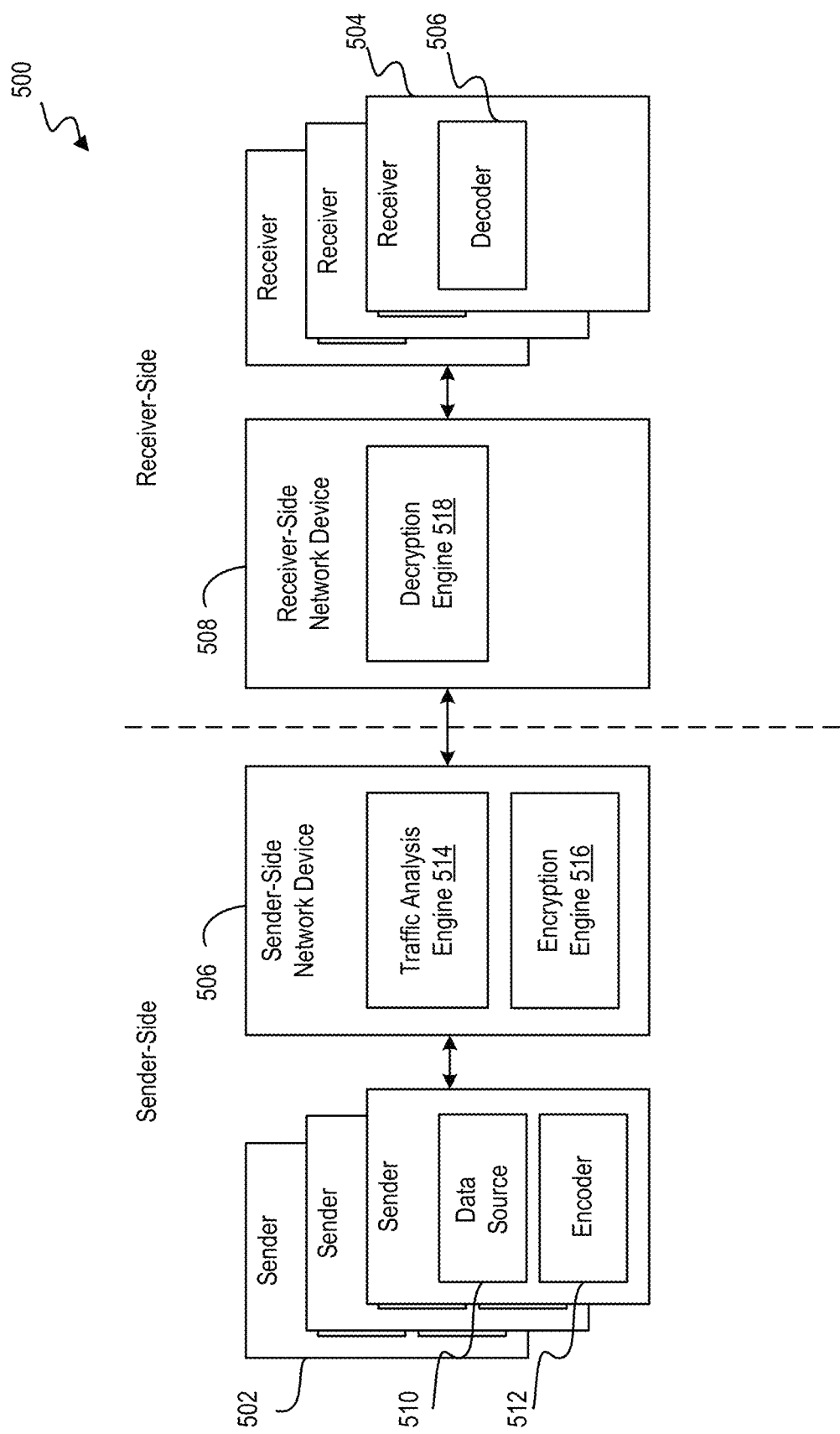
FIG. 5 is a block diagram of an embodiment of a system for selective encryption of tunneled traffic, in accordance with an illustrative embodiment.

Referring now to FIG. 5, depicted is a system 500 for selective encryption of tunneled traffic. The system 500 may include a plurality of senders 502 and a plurality of receivers 504, a sender-side network device 506, and a receiver-side network device 508. The sender-side network device 506 (e.g., a sender-side SD-WAN device) may be configured to identify a protocol used by a network flow traversing the device 506 via one or more packets of the protocol. The device 506 may be configured to determine that a level of encryption for the network flow meets a predetermined threshold. The sender-side network device 506 may be configured to receive one or more packets to be communicated between one of the senders 502 and one of the receivers 504. The packet(s) may include a first portion, which is encrypted, and a second portion, which includes clear text information. The device 506 may be configured to encrypt the second portion of the packet(s), and forward the packet(s) to the receiver-side network device 508 (e.g., via a tunnel). The device 508 may be configured to decrypt the second portion of the packet(s) and forward the packet(s) to the receiver 504.

The systems and methods of the present solution may be implemented in any type and form of device, including clients, servers and/or appliances described above with reference to FIG. 1. For instance, the sender(s) 502 may be implemented at, as, or a component of a server (or client device) and the receiver(s) 504 may be at, as, or a component of a client device (or server). In some implementations, the sender-side and receiver-side network devices 506, 508 may be implemented at, as, or a component of an intermediary device/appliance arranged between the sender(s) 502 and receiver(s) 504. The sender(s) 502 may perform a handshake with the sender-side network device 506 (e.g., to establish a connection between themselves), and the receiver(s) 504 may perform a handshake with the receiver-side network device 508 (e.g., to establish a connection between themselves). While one sender-side network device 506 and one receiver-side network device 508 are shown in FIG. 5, it is noted at that the system 500 may include any number of sender and receiver-side network devices 506, 508, which may be in a handshake with any number of sender(s) 502 and receiver(s) 504. The sender(s) 502, receiver(s) 504, and device(s) 506, 508 may include or incorporate components and devices similar in some aspects to those described above with reference to FIG. 1, such as a memory and/or one or more processors operatively coupled to the memory. The present systems and methods may be implemented in any embodiments or aspects of the appliances or devices described herein.

In some embodiments, the network devices 506, 508 (in combination with the senders 502 and receivers 504) may form or establish a software defined wide-area network (SD-WAN). The network devices 506, 508 may support communications in accordance with multi-stream remote access protocols, such as Independent Computing Architecture (ICA), High-Definition User Experience (HDX) display remoting protocols, and Remote Desktop Protocol (RDP). With multi-stream remote access, the network devices 506, 508 may control quality of service (QoS) (e.g., a range for packet loss, bit rate, throughput, delay, and jitter) for different virtual channels and may have separate ports for delivery of various resources. The network devices 506, 508 may also perform other functions in connection with the communications, such as data compression and caching.

An SD-WAN configuration may involve at least one client (e.g., a receiver 504) executing at least one application (e.g., workspace application), at least one receiver-side network device 508 (e.g., a client-side SD-WAN appliance or device), at least one sender-side network device 506 (e.g., a server-side SD-WAN appliance or device), at least one delivery agent (e.g., a virtual delivery agent (VDA)) residing on a server, and at least one server (e.g., a sender 502) hosting an application (e.g., data source 510) corresponding to an workspace application for instance. For example, the sender-side network device 506 and receiver-side network device 508 may each support or facilitate a set of virtual channels for communications between the senders 502 and receivers 504, among others components.

A receiver 504 (e.g., a client) may request to launch an application at the receiver 504 to access the data source 510 hosted on, executing at, or otherwise residing at the sender 502 (e.g., at a server). The data source 510 (e.g., a network application such as a virtual application, virtual desktop, SaaS application, or web application hosted on the server) may be accessed on the receiver 504 via a corresponding application on the receiver 504. The corresponding application may include a single program or a set of programs accessible via a remote desktop. The sender 502 may receive the request for data from the data source 510 (e.g., the application) from the receiver 504. Upon receipt of the request, the sender 502 may commence execution of the application to remotely provision or deliver data corresponding thereto to the receiver 504. The sender 502 may provide access of the data source 510 to the receiver 504 using a set of virtual channels established between the sender 502 and receiver 504 through the network devices 506, 508. Each virtual channel may communicate a stream of packets between the data source 510 running on the sender 502 and the receiver 504. A pair of network devices 506, 508 can support or carry between/across themselves traffic comprising a plurality of streams or tunnels of traffic. These tunnels can refer to virtual channels (VCs) established using ICA protocol for instance, but there are other possibilities, including multiple layers of protocols. For instance, the traffic flowing through the network devices 506, 508 can have one or more protocols such as transmission control protocol (TCP) or transport layer security (TLS), enlightened data transport (EDT) or datagram transport layer security (DTLS) or user datagram protocol (UDP), common gateway protocol (CGP), ICA framing, custom ICA encryption (e.g. secure ICA), ICA protocol itself (e.g., including compression, such as stateful context-based compression) and interleaving of individual core ICA or VC data streams, and the individual VC protocols.

As shown in FIG. 5, the system 500 may include one or more senders 502. The senders 502 may include server(s), client device(s), network or other intermediary devices, and so forth. The sender(s) 502 may include a data source 510 comprising data. In some implementations, the data source 510 may be an application which generates data. In other implementations, the data source 510 may include memory which stores data. In these and other embodiments, the data source 510 may be designed or implemented to store, include, access, or generate data which may be transmitted (e.g., as one or more packets) to a receiver (also referred to as a recipient) 504. The sender(s) 502 may be configured to transmit data from the data source(s) 510 to recipient(s) 504 (e.g., responsive to a request from the recipients 504, during use of an application by the recipient(s) 504, and so forth).

The sender(s) 502 may include an encoder 512. The encoder 512 may be any device, component, element, application, software, protocol, or other circuitry designed or implemented to encrypt or encode data to be transmitted to a receiver 504. In some implementations, the encoder 512 may be configured to encode data from the data source 512 to be transmitted to the receiver 504. In some implementations, the encoder 512 may be configured to negotiate a protocol between the sender 502 and receiver 504. Various examples of such protocols include HyperText Transfer Protocol (HTTP), Secured HyperText Transfer Protocol (HTTPS), Transport Layer Security (TLS), Datagram Transport Layer Security (DTLS), Secure Real-Time Transport Protocol (SRTP), IP Security (IPSec), OpenVPN, or other protocols described above.

The sender(s) 502 may be configured to route, deliver, forward, or otherwise transmit network traffic (e.g., negotiation packets for negotiating a protocol, packets including data from the data source 510, etc.) to the receiver 504 through one or more network devices 506, 508. In some implementations, the sender 502 may be configured to transmit network traffic to the sender-side network device 506, and the sender-side network device 506 may forward the network traffic to the receiver-side network device 508 for forwarding to a corresponding receiver 504. In this regard, network traffic may flow through the network devices 506, 508 between the senders and receivers 502, 504.

During negotiation (or renegotiation) of a protocol for encoding or encrypting network flow between a sender and receiver 502, 504, initial phase communications and packets of the protocol exchange may be exchanged between the sender and receiver 502, 504 to negotiate the protocol. In some implementations, initial phase communications and packets for negotiating such protocols may not necessarily be encrypted. Hence, at least some packets may include clear text (e.g., data or information readily accessible or read from the packet(s) without performing decryption and/or decoding). Following negotiation of the protocol, the encoder 512 may be configured to encrypt packets for the network flow between the sender 502 and receiver 504 in accordance with the negotiated/re-negotiated protocol. Some protocols may include portions of packets which are encrypted (for instance, a body or payload of the packet), and other portions which are not encrypted (e.g., the header and/or trailer of the packet). Some protocols may renegotiate parameters while network traffic is being pushed from the sender 502 to the receiver 504 (e.g., while the network flow is occurring, intermittent to the network flow, etc.). As described in greater detail below, the sender-side network device 506 may be configured to identify a protocol used by network flow traversing the device 506 between the sender 502 and receiver 506.

The system 500 may include a sender-side network device 506. The sender-side network device 506 may be arranged intermediary to the sender(s) 502 and receiver(s) 504. The sender-side network device 506 may be designed or implemented to receive network traffic from the sender(s) 502 for transmitting, routing, pushing, sending, conveying or otherwise forwarding to a corresponding receiver 504. The sender-side network device 506 may include a traffic analysis engine 514 and an encryption engine 516. The traffic analysis engine 514 may be any device, component, element, application, software, protocol, or other circuitry designed or implemented to analyze, parse, evaluate, or otherwise perform processing functions relating to traffic in the network flow traversing the sender-side network device 506. The encryption engine 516 may be any device, component, element, application, software, protocol, or other circuitry designed or implemented to selectively encrypt network packets (or portions of network packets) based on the network flow.

The traffic analysis engine 514 may be configured to identify a protocol used by the network flow traversing the network device 506. In some embodiments, network traffic from a plurality of senders 502 may traverse the network device 506, with the network traffic having respective protocols that may be same or different from one another. For instance, a first protocol may be used for network flow traversing the network device 506 from a first sender 502, and a second protocol may be used for network flow traversing the network device 506 from a network traffic from a second sender 502 may traverse the network device 506. The traffic analysis engine 514 may be configured to determine, detect, or otherwise identify the protocol used by the network flow traversing the network device 506 via various packets of the protocol.

In some embodiments, the traffic analysis engine 514 may be configured to identify the protocol during negotiation (or renegotiation) of the protocol between the sender 502 and receiver 504. For instance, during negotiation (or renegotiation), the sender 502 or receiver 504 may transmit a handshake packet (which may include one or more configurations, settings, encryption level, or other parameters of the protocol to be negotiated). The recipient (which may be the sender 502 or the receiver 504) may receive the handshake packet, and transmit an acknowledgement, acceptance, etc., of the handshake packet.

The sender-side network device 506 may be designed or implemented to intercept, identify, receive, or otherwise use the handshake packets (or other packets) exchanged between the sender and receiver 504 during negotiation (or renegotiation) of the protocol. The traffic analysis engine 514 may be configured to analyze, parse, or otherwise inspect the (e.g., clear text portion of the) intercepted packets for identifying the protocol. For example, the traffic analysis engine 514 may be configured to inspect the packets to identify characteristics of the encryption used to encrypt the packets. At least some protocols may use encryption schemes which encrypt data in a unique manner (e.g., using a particular type of encryption and/or a certain level of encryption). The traffic analysis engine 514 may be configured to identify the protocol based on the manner in which an intercepted packet was encrypted. As another example, the traffic analysis engine 514 may be configured to identify the protocol based on the handshake packet (e.g., according to the content and/or structure of the packet). The traffic analysis engine 514 may be configured to parse or analyze the handshake packet to extract identification information used to identify the protocol. Each protocol may use a specific type of handshake packet. The traffic analysis engine 514 may be configured to determine, detect, or otherwise identify the protocol based on a comparison with the handshake packet intercepted by the network device 506 with handshake packets used for various protocols.

In some embodiments, the traffic analysis engine 514 may be configured to identify one or more parameters of the encryption used by the protocol. The traffic analysis engine 514 may be configured to identify the parameters using analyzed, parsed, or inspected packets, based on the identified protocol itself, etc. For instance, the parameters may include a level of encryption (or a security parameter), a type or scheme of encryption, a key strength or complexity, and so forth. Each protocol may include corresponding parameters for encryption. For instance, some protocols may use one form or type of encryption, whereas other protocols may use a different form or type of encryption. However, each protocol may use a specific type of encryption, which may include various parameters. The traffic analysis engine 514 may be designed or implemented to determine, detect, look up, or otherwise identify one or more parameters of the encryption to be used by the protocol. The traffic analysis engine 514 may be configured to maintain, include, or otherwise access a table, database, or other data structure which includes parameters corresponding to various protocols. The traffic analysis engine 514 may be configured to access the data structure and cross-reference the identified protocol to identify the corresponding parameters.

In some embodiments, the traffic analysis engine 514 may be configured to identify an application of the network flow. As described above, the data source 510 may include or correspond to an application which is accessed by the receiver 504 and executing on the sender 502. The application may generate data (e.g., packets) which are transmitted through the network devices 506, 508 to the receiver 504. The traffic analysis engine 514 may be configured to trace, determine, track, or otherwise identify the application of the network flow using the packets of the network flow. The packets may include a header specifying, identifying, or otherwise indicating the sender 502 and recipient 504. The traffic analysis engine 514 may be configured to parse the packets to identify the sender 502 and, correspondingly, the application which generated the packet.

The traffic analysis engine 514 may be configured to apply a predetermined threshold to the protocols for the network flow through the network device 506 to determine whether or not the level of encryption for the respective protocols satisfy the predetermined threshold. The predetermined threshold may be set by a network administrator (e.g., for the receiver 504, for the sender 502, etc.). The predetermined threshold may correspond to the level of encryption. The traffic analysis engine 514 may be configured to determine whether the level of encryption satisfies the predetermined threshold for encrypting the network traffic, or for partially encrypting portions of the network traffic. For instance, where the protocols meet (e.g., satisfies, exceeds, etc.) the predetermined threshold, the encryption engine 516 may avoid encrypting (the already secured, protected or encrypted) portions of packets for the network flow corresponding to the protocol. Where one or more of the protocols do not meet the predetermined threshold, the encryption engine 516 may encrypt each of the packets for the network flow corresponding to those protocols (e.g., portions which were previously encrypted, and portions which were not encrypted), as described in greater detail below. Various non-limiting examples of protocols having encryption levels which may satisfy the predetermined threshold may include HTTPS, TLS, DTLS, SRTP, IPSec, OpenVPN, etc. The traffic analysis engine 514 may be configured to apply the predetermined threshold to the protocol to determine whether the level of encryption for the protocol meets the predetermined threshold.

The traffic analysis engine 514 may be configured to maintain, include, or otherwise access encryption rules corresponding to various applications, protocols, levels of encryption, etc. In some embodiments, the traffic analysis engine 514 may be configured to identify one or more encryption rules based on the application. For instance, certain applications may use a level of encryption (or protocol having a level of encryption) which correspond, correlate to, or are otherwise associated with particular encryption rules. In some embodiments, the traffic analysis engine 514 may be configured to identify one or more encryption rules based on the protocol (or level of encryption corresponding to the protocol) used for the network flow. The encryption rules may specify encryption of portions of packets network traffic (e.g., header information, payload information, negotiation or handshake packets, etc.). The traffic analysis engine 514 may be configured to determine, look-up, or otherwise identify the encryption rules for applying to the network flow to selectively encrypt (e.g., by the encryption engine 516) packets (or portions thereof) in accordance with the encryption rules.

The traffic analysis engine 514 may be configured to receive networks packets to be communicated between a sender 502 and a receiver 504. At least some of the network packets may include an encrypted portion (for instance, a payload) and an unencrypted portion (e.g., a portion including clear text information, such as a header or trailer). Some of the network packets may be fully encrypted. Each of the network packets may correspond to one of the protocols for network flow traversing the network device 506.

The encryption engine 516 may be configured to apply the encryption rules (e.g., identified by the traffic analysis engine 514) to the network packets corresponding to the respective protocols. Some network packets may include clear text information (e.g., unencrypted portions of the network packet). Some network packets may be encrypted using a protocol which does not satisfy the predetermined threshold. The encryption engine 516 may be configured to apply the encryption rules to the network packets received by the network device 506 to identify the various portions of packets and/or types of packets, and to selectively encrypt certain network packets (or portions thereof). In some embodiments, the encryption engine 516 may be configured to encrypt portions of the network packets having clear text information. As such, while the sender 502 may not have encrypted such portions, the encryption engine 516 of the sender-side network device 506 may be configured to encrypt those portions including clear text information or those packets or portions thereof that may not satisfy the predetermined threshold. Other portions of the network packet may include encrypted portions (e.g., encrypted according to a protocol which satisfies the predetermined threshold). In such instances, the encryption engine 516 may bypass, forego or avoid encrypting such portions (e.g., the payload of the packet, for instance) which are encrypted. The encryption engine 516 may be configured to encrypt portions of the network packets to be forwarded (e.g., via the tunnel) to the receiver-side network device 508.

In some implementations, the network packets may be encrypted according to a protocol which does not meet the predetermined threshold. For instance, a second protocol of a second network flow may have a level of encryption which falls below the predetermined threshold. The sender-side network device 506 may be configured to receive such network packets corresponding to the network flow. The encryption engine 516 may be configured to encrypt the network packets corresponding to the second network flow. In some implementations, the encryption engine 516 may be configured to encrypt both the encrypted portions and the unencrypted portions (e.g., portions of the network packets containing or including clear text information). As such, the sender 502 may encrypt a portion of the network packet (e.g., using a protocol having a level of encryption which falls below the predetermined threshold), and the sender-side network device 506 may be configured to encrypt the same portion of the network packet. The encryption engine 516 may be configured to encrypt such portions of the network packet so that the level of encryption meets, satisfies, or exceeds the predetermined threshold. Hence, some portions of the network packet may be encrypted twice (e.g., a first layer of encryption and a second layer of encryption).

The sender-side network device 506 may be configured to forward or send the network packet(s) via a tunnel to the receiver-side network device 508. The sender-side network device 506 may be configured to forward the encrypted network packets (e.g., packets which were encrypted by the sender 502 and packets which were encrypted by both the sender 502 and sender-side network device 506) to the receiver-side network device 508. The network packets may include portions which were encrypted by sender 502 and portions which were encrypted by the sender-side network device 506. Some portions may be encrypted both by the sender 502 and by the sender-side network device 506. The sender-side network device 506 may be configured to forward the network packets to the receiver-side network device 508 via a tunnel. The tunnel may be a virtual tunnel formed between the sender and receiver-side network device 506, 508. The tunnel may be formed during negotiation of the protocol. The sender-side network device 506 may be configured to establish and/or identify the tunnel to use for forwarding the network packets based on the receiver 504 which is to receive the network packet(s). The sender-side network device 506 may be configured to forward the network packets using a network address corresponding to the receiver-side network device 508 or the receiver 504.

As shown in FIG. 5, the system 500 may include a receiver-side network device 508. The receiver-side network device 508 may be arranged intermediary to the sender-side network device 506 and the receivers 504. The receiver-side network device 508 may be configured to receive the network packets from the sender-side network device 506 (e.g., via the tunnel formed or established between the sender and receiver-side network device 506, 508). The receiver-side network device 508 may be configured to receive the network packets on behalf of the receiver 504. As described in greater detail below, the receiver-side network device 508 may be configured to (at least partially) decrypt the network packets for forwarding to the receiver 504.

The receiver-side network device 508 may include a decryption engine 518. The decryption engine 518 may be similar in some respects to the encryption engine 516 of the sender-side network device 506. The decryption engine 518 may be any device, component, element, application, software, protocol, or other circuitry designed or implemented to selectively decrypt network packets (or portions of network packets) received from the sender-side network device 506. The decryption engine 518 may be configured to identify, detect, or otherwise determine that network packets received via the tunnel from the sender-side network device 506 were encrypted by the sender-side network device 506 (e.g., based on an initial packet, based on a format of the network packets, based on the manner in which the network packets were encrypted being different from the encryption method used by the sender 502, etc.). The decryption engine 518 may be configured to identify those network packets encrypted by the encryption engine 516.

The decryption engine 518 may be configured to decrypt portions of the network packets which were encrypted by the encryption engine 516. The decryption engine 518 and encryption engine 516 may use or implement a common encryption scheme (for instance, a public and private key scheme), which may be different from the encryption scheme implemented by the sender 502. Thus, the decryption engine 518 may be configured to decrypt network packets which were encrypted by the encryption engine 516. The decryption engine 518 may be configured to decrypt portions of the network packets that has the clear text information (for instance, header information, trailer information, negotiation or renegotiation packets containing handshake information, and other portions or network packets containing unencrypted or clear text information) encrypted by the sender-side network device.

The decryption engine 518 may be configured to decrypt portions of the network packets which were encrypted by both the sender 502 and the sender-side network device 506. The decryption engine 518 may be configured to decrypt such portions to revert the portion of the network packet to the encryption performed by the sender 502. Hence, rather than wholly decrypting portions having two layers of encryption (e.g., one by the sender 502 and another by the sender-side network device 506), the decryption engine 518 may be configured to decrypt one layer of the encryption such that the portion of the network packet has one layer of encryption (e.g., by the sender 502).

The receiver-side network device 508 may be configured to forward, provide, or otherwise transmit the decrypted network packet(s) to the receiver 504. The receiver-side network device 508 may be configured to transmit partially decrypted network packets to the receiver for further decryption or decoding by the receiver 504. The receiver 504 may be configured to receive the partially (or fully) decrypted network packets. The receiver 504 may include a decoder 520. The decoder 520 may be similar in some respects to the encoder 512 of the sender 502. The decoder 520 may be any device, component, element, application, software, protocol, or other circuitry designed or implemented to decrypt or decode data received from a sender 502. The decoder 520 may be configured to decode data which was encoded or encrypted by the encoder 512 of the sender 502. The decoder 520 may be configured to decode or decrypt data in accordance with the protocol for the network flow between the sender 502 and receiver 504. Hence, in some instances, network packets may undergo two layers of encoding and decoding. A first layer of encoding and decoding may be performed by the sender 502 and receiver 504, and a second layer of encoding and decoding may be performed by the sender-side network device 506 and the receiver-side network device 508. Such implementations and embodiments may ensure the data transmitted or exchanged between senders and receivers 502, 504 is sufficiently protected through multiple layers of encoding/encryption.

Figure 6:
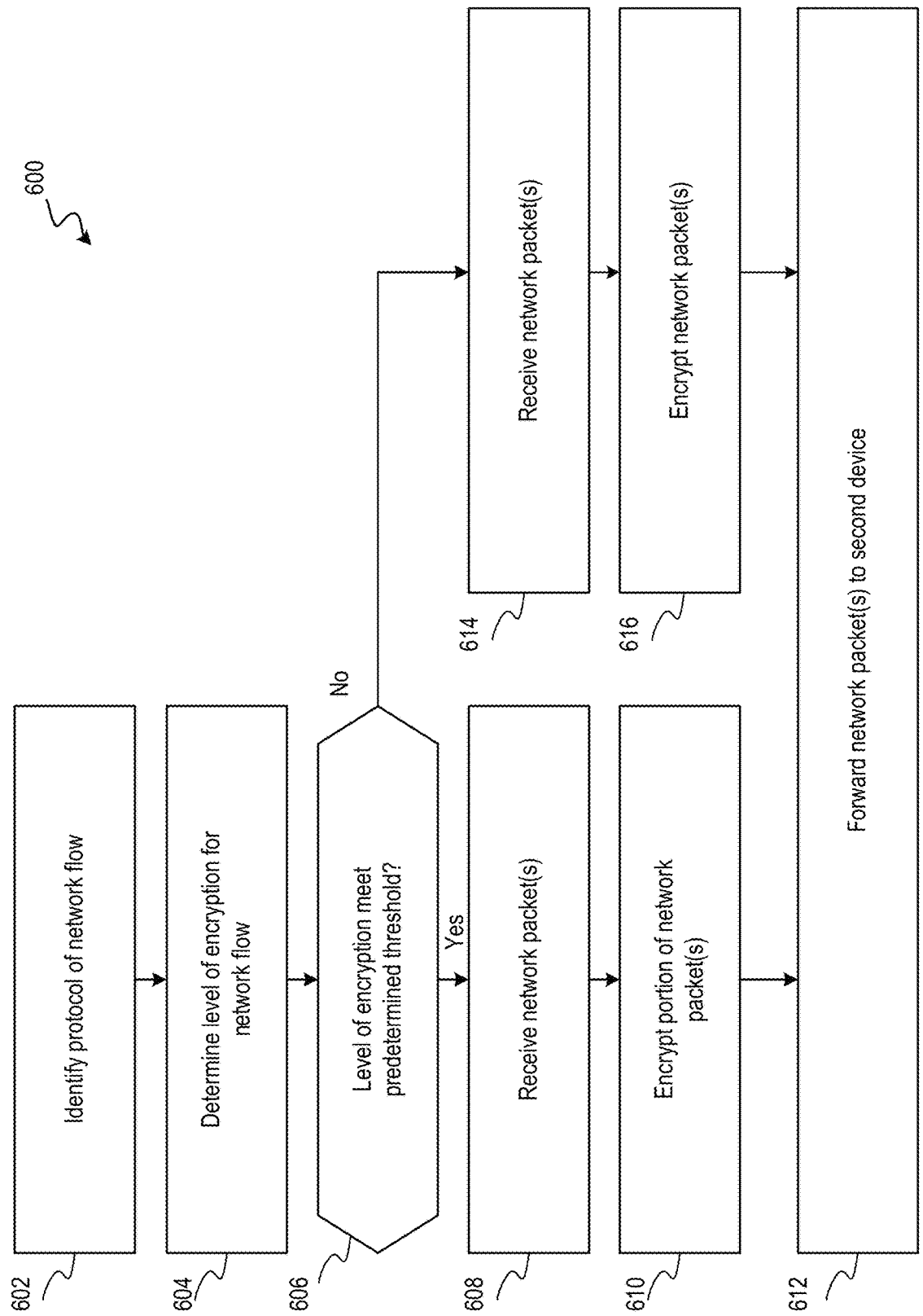
FIG. 6 is a flow chart showing a method for selective encryption of tunneled traffic, in accordance with an illustrative embodiment.

Referring now to FIG. 6, an implementation of a method 600 for selective encryption of traffic (e.g., tunneled encrypted traffic) will be described. In brief overview of method 600, at step 602, a first device identifies a protocol of network flow. At step 604, the first device determines a level of encryption for the network flow. At step 606, the first device determines whether the level of encryption meets a predetermined threshold. At step 608, where the level of encryption meets the predetermined threshold, the first device may receive network packets. At step 610, the first device may encrypt a portion of the network packets. At step 612, the first device may forward the network packet(s) to a second device. At step 614, where the level of encryption does not meet the predetermined threshold, the first device may receive network packets. At step 616, the first device may encrypt the network packets.

At step 602, and in some embodiments, a first device identifies a protocol of network flow. In some embodiments, the first device may identify a protocol used by a network flow traversing the first device via one or more packets of the protocol. The first device may be arranged intermediary to a plurality of senders and a plurality of receivers. The first device may receive the one or more packets of the protocol from a sender of the plurality of senders. The first device may intercept packets of the network protocol to be sent (e.g., by the sender) to a receiver of the plurality of receivers. The first device may identify the protocol using the packets sent, transmitted, forwarded, or otherwise provided by the sender to the receiver. The first device may identify the protocol in packets that are initially exchanged between the sender and receiver through the first device (e.g., during negotiation of the protocol).

In some embodiments, the first device may identify the protocol during one of negotiation or renegotiation of the protocol between the sender and the receiver. In some instances, the sender and receiver may negotiate the protocol initially (e.g., prior to transmitting, providing, or otherwise exchanging data between the sender and receiver). In some instances, the sender and receiver may negotiate (or re-negotiate) intermittently (e.g., between, during, or while packets are exchanged between the sender and receiver). The sender and receiver may negotiate the protocol by exchanging handshake packets (or other negotiation packets). The first device may intercept the packets exchanged between the sender and receiver during negotiation of the protocol. The first device may parse the packet(s) to identify the protocol.

In some embodiments, the first device may identify one or more parameters of the encryption for or used by the protocol. Each protocol may use, correspond to, implement, or otherwise be associated with one or more parameters of encryption. For instance, a protocol may correspond to a particular parameter or set of parameters. The first device may identify the parameters which are associated with the particular protocol. The first device may identify the parameters by cross-referencing the identified protocol with a list of protocols and their associated parameters. The parameters may include a type of encryption, a level of encryption, an application which transmitted the packets, a sender, a receiver, etc. The first device may parse the one or more packets to identify the parameters of the encryption.

In some embodiments, the first device may identify encryption rules based on or according to the parameters. The first device may identify the encryption rules based on the parameters including, for instance, the level of encryption, the application which generated the data received from the sender by the first device, etc. The encryption rules may include, for instance, rules in which the sender encrypts data to be transmitted from the sender to a receiver. The first device may identify the encryption rules corresponding to the protocol. The first device may identify the encryption rules corresponding to the protocol in which the sender and receiver negotiated for network flow between the sender and the receiver.

In some embodiments, the first device may identify an application of the network flow. The application may be the application residing, executing, hosting, or otherwise corresponding to the sender which generates packets for transmission to the receiver. The first device may identify the application based on the packets exchanged between the sender and receiver. In some implementations, the first device may identify the application based on header information included in the packet. The header may specify the application which generated the packets. The first device may parse the packets to identify the application which generated, transmitted, or otherwise corresponds to the network flow.

In some embodiments, first device may identify encryption rules for partially encrypting portions of the network traffic (e.g., by the first device). The first device may identify the encryption rules based on the protocol corresponding to the network flow, based on the sender, based on the receiver, etc. The first device may identify the encryption rules based on the application which generated the packets. The first device may identify the encryption rules by cross-referencing the protocol, sender, receiver, application, etc., with a list, database, or other data structure including corresponding protocols and encryption rules. The first device may identify the encryption rules from within the data structure.

At step 604, and in some embodiments, the first device determines a level of encryption for the network flow. The first device may determine the level of encryption based on the identified parameters corresponding to the protocol. The first device may determine the level of encryption responsive to receiving the data from the sender to the receiver.

At step 606, and in some embodiments, the first device determines whether the level of encryption meets a predetermined threshold. The first device may retrieve, identify, maintain, or otherwise access a predetermined (e.g., defined or specified) threshold. The predetermined threshold may correspond to a protocol of a plurality of protocols identified for network traffic. The first device may apply the predetermined threshold to the identified protocol (e.g., at step 602). The first device may apply the predetermined threshold to determine whether the level of encryption for the network flow meets the predetermined threshold. In some instances, the level of encryption for network flow corresponding to a first sender may meet the predetermined threshold, and a level of encryption for network flow corresponding to a second sender may not meet the predetermined threshold. Where the level of encryption meets the predetermined threshold, the method 600 may proceed to step 608. Where the level of encryption does not meet the predetermined threshold, the method 600 may proceed to step 614.

At step 608, and in some embodiments, where the level of encryption meets the predetermined threshold, the first device may receive network packets. The first device may receive one or more network packets to be communicated between a sender and a receiver. The network packets may include a first portion which is encrypted and a second portion that has clear text information. The first device may receive the one or more network packets as the network packets traverse the network flow from the sender to the receiver. The first device may receive network packets prior to the network packets being delivered to the receiver. The first device may apply the encryption rules to the network packets for selectively encrypting portions of the network packets, as described in greater detail below.

At step 610, and in some embodiments, the first device may encrypt a portion of the network packets. In some embodiments, the first device may encrypt the second portion of the packets based on the protocol. As described above, the protocol may specify encryption of some portions of the network packets (e.g., payload data, for instance) while other portions of the network packets may remain unencrypted (e.g., containing clear text information). The first device may encrypt the portion of the network packet including clear text information. As such, the first device may encrypt the second portion of the network packet such that the network packet is fully encrypted (e.g., all portions of the network packet is encrypted). In some embodiments, the first device may encrypt the portions of the network packets corresponding to the network traffic according to the encryption rules (e.g., identified as described above). In some embodiments, the first device may encrypt the second portion of the network packets while avoiding encrypting the first portion of the network packets (e.g., the portions of the network packet which were encrypted by the sender).

At step 612, and in some embodiments, the first device may forward (e.g., route or send) the network packet(s) to a second device. In some embodiments, the first device may forward the network packets with the first portion (e.g., which was encrypted by the sender) and the encrypted second portion (e.g., which was encrypted by the first device at step 610) via a tunnel to a second device. The second device may be located, arranged, or otherwise situated intermediary to the plurality of senders and the plurality of receivers for decryption of the encrypted second portion for forwarding to the receiver. The first device may forward the network packets for decryption by the second device.

In some embodiments, the second device may receive the network packets from the first device. The second device may receive the network packets via the tunnel. The second device may receive the network packets for decrypting (e.g., by the second device) and forwarding from the second device to the receiver. The second device may decrypt the encrypted portions of the network packet (e.g., encrypted at step 610). The second device may decrypt the encrypted portions of the network packet which were encrypted at step 610, while maintaining the portions of the network packet encrypted by the sender and received at step 608.

At step 614, and in some embodiments, where the level of encryption does not meet the predetermined threshold, the first device may receive network packets. Step 614 may be similar in some respect to step 608. In some instances, the network packets received at step 614 may include a first portion (e.g., which was encrypted according to a protocol which does not meet the predetermined threshold) and a second portion (e.g., which includes clear text information). In some instances, the network packets received at step 614 may include clear text information. In some embodiments, a plurality of network flow may traverse the first device. A first protocol of a first network flow may have a level of encryption which meets the predetermined threshold, and a second protocol of a second network flow may have a level of encryption below the predetermined threshold. In such instances, the packets corresponding to the first protocol may be encrypted according to step 610 and the packets corresponding to the second protocol may be encrypted according to step 616, as described in greater detail below.

At step 616, and in some embodiments, the first device may encrypt the network packets. In some embodiments, the first device may encrypt the entirety of the network packets. The first device may encrypt both the unencrypted portions of the second network flow and the encrypted portions of the second network flow. As such, at least some portions of the packets corresponding to the second network flow may include two layers of encryption (e.g., a first layer of encryption performed by the sender and a second layer of encryption performed by the first device). The first device may encrypt the network packets for transmission via the tunnel. From step 616, the method 600 may proceed to step 612, where the first device transmits the network packets to the second device. The second device may decrypt network traffic received from the first device, and forward the network traffic to the receiver. The receiver may decrypt the network traffic received from the second device according to the protocol negotiated between the sender and the receiver.

F. Systems and Methods for Using Unencrypted Communication Tunnels

Figure 7:
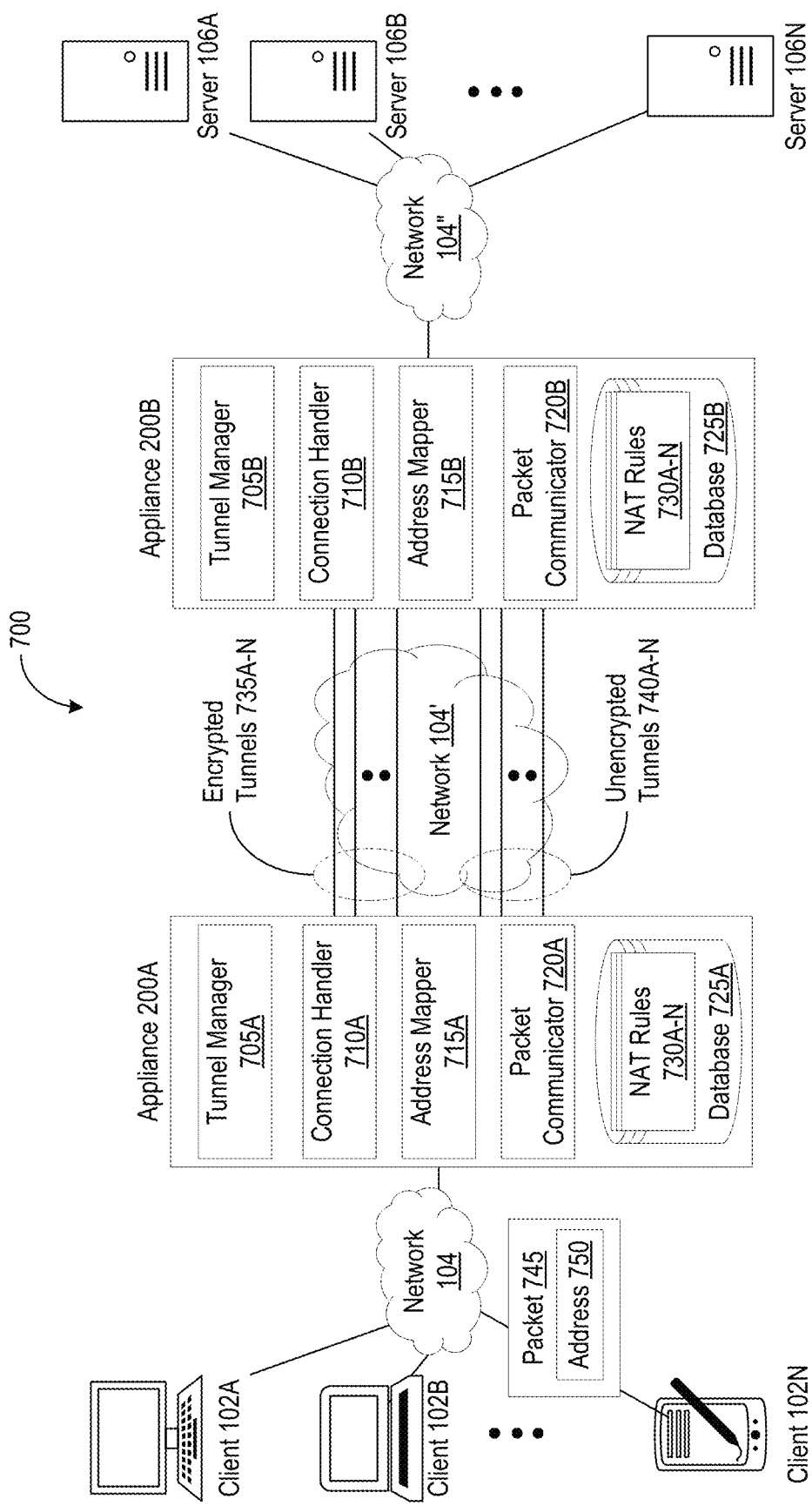
FIG. 7 is a block diagram of an embodiment of a system for using unencrypted communicating tunnels in accordance with an illustrative embodiment.

Referring now to FIG. 7, depicted is a system 700 for using unencrypted communication tunnels. In overview, the system 700 may include one or more clients 102A-N (hereinafter generally referred to as clients 102) and one or more servers 106A-N (hereinafter generally referred to as servers 106). In addition, the system 700 may include a client-side appliance 200A, and a server-side appliance 200B (both sometimes generally referred herein as an appliance 200 or device 200). The system 700 may include at least one network 104 to communicatively couple the clients 102 with the client-side appliance 200A, at least one network 104' to communicatively couple the client-side appliance 200A and the server-side appliance 200B, and at least one network 104" to communicatively couple the servers 106 and the server-side appliance 200B. The network 104' may be, for example, a public network such as campus area network, a metropolitan area network, or the Internet, among others. The networks 104 and 104" may be, for example, a private network such as a local area network, an enterprise network, or an Intranet, among others. The client-side appliance 200A may include at least one tunnel manager 705A, at least one connection handler 710A, at least one address mapper 715A, at least one packet communicator 720A, and/or at least one database 725A. The server-side appliance 200B may include at least one tunnel manager 705B, at least one connection handler 710B, at least one address mapper 715B, at least one packet communicator 720B, and/or at least one database 725B.

The systems and methods of the present solution may be implemented in any type and form of device, including clients, servers and/or appliances 200. As referenced herein, a "server" may sometimes refer to any device in a client-server relationship, e.g., an appliance 200 in a handshake with a client 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

In further detail, the tunnel manager 705A executing on the client-side appliance 200A and the tunnel manager 705B executing on the server-side appliance 200B may initiate, establish, or maintain a set of encrypted tunnels 735A-N (hereinafter generally referred to as encrypted tunnels 735). Packets carried across the encrypted tunnel 735 may be encrypted by the transmitting appliance 200 prior to transmission. The tunnel manager 705A may establish the encrypted tunnels 735 with the tunnel manager 705B over the network 104', or vice-versa. The encrypted tunnels 735 may function as an overlay network over the network 104'. The encrypted tunnels 735 may be established between the client-side appliance 200A and the server-side appliance 200B over the network 104' in accordance with an encrypted tunneling protocol. The protocol may include, for example, Internet Protocol Security (IPSec), Transport Layer Security (TLS), Datagram Transport Layer Security (DTLS), Secure Shell (SSH), and Secure Socket Tunnel Protocol (SSTP), among others. The encryption algorithm to be applied to the packets exchanged across the encrypted tunnels 735 may include, for example, Rivest-Shamir-Adleman (RSA), Elliptic-curve Diffie-Hellman (ECDH), Data Encryption Standard (DES), Advanced Encryption Standard (AES), Secure Hash Algorithm (SHA) (e.g., SHA-1, SHA-2, or SHA-3), and Message Digest algorithm (e.g., MD5), among others. Once established, the client-side appliance 200A and the server-side appliance 200B may encrypt and exchange packets through one of the encrypted tunnels 735.

In addition, the tunnel manager 705A executing on the client-side appliance 200A and the tunnel manager 705B executing on the server-side appliance 200B may initiate, establish, or maintain a set of unencrypted tunnels 740A-N (hereinafter generally referred to as unencrypted tunnels 740). Packets carried across the unencrypted tunnel 740 may lack encryption applied by the transmitting appliance 200 prior to transmission. The tunnel manager 705A may establish the unencrypted tunnels 740 with the tunnel manager 705B over the network 104', or vice-versa. The unencrypted tunnels 740 may function as an overlay network over the network 104'. The unencrypted tunnels 740 may be established between the client-side appliance 200A and the server-side appliance 200B over the network 104' in accordance with an encrypted tunneling protocol. The protocol may include, for example, using Generic Routing Encapsulation (GRE), among others. Once established, the client-side appliance 200A and the server-side appliance 200B may exchange packets through one of the unencrypted tunnels 740 without applying additional encryption by the appliances 200A or 200B.

The connection handler 710A executing on the client-side appliance 200A may identify, intercept, or otherwise receive at least one packet 745 from the client 102. The packet 745 may be generated by the client 102 and transmitted to the server 106, and may be received by the client-side appliance 200A. The packet 750 may include a header and a body. The header of the packet 745 may include address information 745. The address information 750 may include a source address, a source port, a destination address, and/or a destination port, among others. The source address may include a network address referencing the client 102. The source port may reference a port associated with transmission of the packet 745 from the client 102. The destination address may include a network address referencing the server 106. The destination port may reference a port associated with receipt of the packet 745 at the server 106. The body may include the payload data to be transmitted to the server 106. Upon receipt, the connection handler 710A may parse the packet 745 to identify the header and/or the body.

From parsing the contents of the packet 745, the connection handler 710A may identify and/or select a tunnel from the set of encrypted tunnels 735 or the unencrypted tunnels 740 to communicate the packet 745. The connection handler 710A may determine whether the packet 745 is a handshake message based on the contents of the packet 745. In some embodiments, the packet 745 may be a handshake message (e.g., a client hello message) to establish a secure connection between the client 102 and the server 106) to send at least another packet. The handshake message may be in accordance with a TLS handshake procedure, a Transmission Control Protocol (TCP) three-way handshake protocol, or a Simple Mail Transfer Protocol (SMTP), among others. The packet 745 may be determined as a handshake message based on contents of the header or the body. For example, the handshake message for the TLS handshake protocol may include a code indicating that the packet 745 is a client hello message.

When the packet 745 is determined to lack contents associated with any of the handshake protocols, the connection handler 710A may determine that the packet 745 is not a handshake message. In some embodiments, the connection handler 710A may select one of the encrypted tunnels 735 to communicate the packet 745 between the client 102 and the server 106, e.g., responsive to the determination. In some embodiments, the selection of the encrypted tunnel 735 may be based on utilization of the encryption tunnel 735 by the client 102, the server 106, the client-side appliance 200A or the server-side appliance 200B in communicating packets. In some embodiments, the connection handler 710A may identify an encryption algorithm applied to the packet 745. In generating the packet 745, (an application executing on) the client 102 (or the server 106) may have applied one or more encryption algorithms to the packet 745. The connection handler 710A may identify the encryption algorithm applied based on the client 102 or an application executing on the client 102 that generated and transmitted the packet 745. For example, certain applications running on the client 102 may be pre-identified or associated with certain encryption algorithms.

In contrast, when the packet 745 is determined to contain contents associated with one of the handshake protocols, the connection handler 710A may determine that the packet 745 is the handshake message. In addition, the connection handler 710A may facilitate or process the handshake in accordance to the handshake protocol as specified in the handshake message via the network 104'. For example, through the connection handler 710A and/or the connection handler 710B, the client 102 and the server 106 may exchange a client hello message, a server hello message, a server certificate, a client key exchange, and cipher specification, among other messages in accordance with the handshake protocol in establishing the secure connection. In some embodiments, the connection handler 710A may communicate the handshake message through one of the encrypted channels 735 over the network 104' to facilitate the handshake protocol.

While processing the handshake, the connection handler 710A may determine whether the handshake is successful. An error may occur while the handshake protocol is carried out between the client 102 and the server 106. In some embodiments, the connection handler 710A may monitor the handshake process and may parse each handshake message exchanged between the client 102 and the server 106. By monitoring and parsing, the connection handler 710A may identify an error condition. The error condition may correspond to an error message (e.g., a packet with a HTTP status code 400 404, 500, 502, 503, or 504) or a time out. The time out may correspond to not receiving a message from the client 102 or the server 106 within a time limit for the time out.

With the identification of the error condition during the course of the handshake process, the connection handler 710A may determine that the handshake is not successful. In response to determining that the handshake is not successful, the connection handler 710A may select one of the encrypted tunnels 735 to communicate the packet 745 (e.g., a subsequent packet, such as a message to re-attempt handshake, or an unencrypted packet) between the client 102 and the server 106. In some embodiments, the selection of the encrypted tunnel 735 may be based on utilization of the encryption tunnel 735 by the client 102, the server 106, the client-side appliance 200A or the server-side appliance 200B in communicating packets. In some embodiments, the connection handler 710A may identify an encryption algorithm applied to the packet 745 (e.g., via inspection or parsing of a handshake message). In generating the packet 745, the client 102 (or the server 106) may have applied one or more encryption algorithms to the packet 745, which may be identified to be of insufficient strength for example. The connection handler 710A may identify the encryption algorithm applied based on the client 102 or an application executing on the client 102 that generated and transmitted the packet 745. For example, certain applications running on the client 102 may be pre-identified or associated with encryption algorithms.

In some cases, the connection handler 710A may determine that the handshake is successful upon receipt of a handshake completion message (e.g., a client handshake finished message or server handshake finished message). When the handshake is determined to be successful, the connection handler 710A may identify one or more encryption algorithms that is to be applied by the client 102 or the server 106 in communicating packets in the secure connection. At least one of the handshake messages (e.g., client hello message) exchanged between the client 102 and the server 106 may include a list of encryption algorithms (e.g., cipher suites) to be applied to packets in the secure connection. The encryption algorithms listed in the handshake message may include, for example: Rivest-Shamir-Adleman (RSA), Elliptic-curve Diffie-Hellman (ECDH), Data Encryption Standard (DES), Advanced Encryption Standard (AES), Secure Hash Algorithm (SHA) (e.g., SHA-1, SHA-2, or SHA-3), and Message Digest algorithm (e.g., MD5), among others. By parsing the list in the packet 745, the connection handler 710A may identify the encryption algorithms to be used in the connection between the client 102 and the server 106.

With the identification of the encryption algorithm, the connection handler 710A may determine whether the encryption algorithm to be applied to the packet 745 satisfies a threshold. The threshold may demarcate a level of the encryption algorithm at which the resulting connection is considered to be sufficiently secure. In some embodiments, the determination may be based on a length of the block size (e.g., of the payload) generated from the application of the encryption algorithm. In some embodiments, the determination may be based on a comparison of the identified encryption algorithm with a list of encryption algorithm pre-identified as secure. For example, a security administrator may specify the following set of ciphers as sufficiently secure:

TLS_ECDHE_ECDSA_WITH_AES_256_GCM_SHA384;
TLS_ECDHE_ECDSA_WITH_AES_128_GCM_SHA256;
TLS_ECDHE_RSA_WITH_AES_256_GCM_SHA384;
TLS_ECDHE_RSA_WITH_AES_128_GCM_SHA256;
TLS_ECDHE_RSA_WITH_CHACHA20_POLY1305_SHA256;
TLS_ECDHE_RSA_WITH_AES_256_GCM_SHA384.

If the encryption algorithm applied to the packet 745 matches at least one of the list of encryption algorithms, the connection handler 710A may determine that the encryption algorithm to be applied satisfies or meets the threshold. The connection handler 710A may also select one of the unencrypted tunnels 740. In some embodiments, the selection of the unencrypted tunnel 740 may be based on utilization of the unencrypted tunnel 740 by the client 102, the server 106, the client-side appliance 200A or the server-side appliance 200B in communicating packets. Conversely, if the encryption algorithm applied to the packet 745 does not match with any on the list of encryption algorithms (e.g., providing sufficient strength or security), the connection handler 710A may determine that the encryption algorithm to be applied does not satisfy the threshold. The connection handler 710A may also select one of the encrypted tunnels 735. In some embodiments, the selection of the unencrypted tunnel 740 may be based on utilization of the encrypted tunnel 735 by the client 102, the server 106, the client-side appliance 200A or the server-side appliance 200B in communicating packets.

In conjunction, the address mapper 715A executing on the client-side appliance 200A may store and maintain a set of network address translation (NAT) rules 730A-N (hereinafter generally referred to NAT rules 730) onto the database 725A. In some embodiments, the address mapper 715A may generate and/or provide the set of NAT rules 730 to apply to the packets 745 communicated between the client-side appliance 200A and the server-side appliance 200B. Each NAT rule 730 may define or specify a mapping between: an initial source address to a modified source address; an initial source port to a modified source port; an initial destination address to a modified destination address; an initial destination port to a modified destination port; and/or some combination of address(es) and/or port(s) to another combination of address(es) and/or port(s), among others. The mapping of the NAT rule 730 may be defined using a table or a function, among others. For example, the NAT rule 730 may contain a function configured by the system administrator to translate the address information 750.

In some embodiments, the address mapper 715A may associate each NAT rule 730 with one of the tunnels, such as the encrypted tunnels 735 and/or the unencrypted tunnels

740. The NAT rule 730 applied to translate address information 750 of packets 745 may differ depending on the tunnel (or connection). For example, the first NAT rule 730A may be used to translate address information 750 in the packets 745 for the first unencrypted tunnel 740A. In certain embodiments, the second NAT 730B may be used to translate the address information 750 in the packets 745 for the first encrypted tunnel 734A, e.g., to provide additional security. In some embodiments, the NAT rule 730 itself may specify which tunnel (e.g., the encrypted tunnel 735 or the unencrypted tunnel 740) the translation of the address information 750 is to be applied. The association of the NAT rules 730 with the tunnels may be stored and maintained by the address mapper 715A on the database 725A.

In some embodiments, the address mapper 715A may use or maintain the NAT rule 730 for the connection for a time period during which the NAT rule 730 is to be determined as valid. The NAT rule 730 may be considered valid until a timeout event (e.g., communication/receipt of a packet containing a timeout indicator) or until an occurrence of an inactivity condition. The inactivity condition may correspond to when the connection between the client 102 and the server 106 becomes inactive, and may be defined by a threshold elapsed amount of time during which no packets are exchanged via the connection. Beyond the threshold elapsed amount of time, the NAT rule 730 may be deemed expired. In some embodiments, the address mapper 715A may associate each NAT rule 730 to a connection between a client 102 and a server 106 (e.g., from a plurality of connection between at least one client 102 and at least one server) over which the packet 745 is to be communicated. In some embodiments, the NAT rule 730 itself may specify which connection (between one of the clients 102 and one of the servers 106) the translation of the address information 750 is to be applied. In some embodiments, the NAT rule 730 itself may specify the timeout event or the inactivity condition.

In addition, the address mapper 715A may provide, transmit, or send one or more of the NAT rules 730 to the server-side appliance 200B via the network 104'. The NAT rules 730 may be used to convert the original address information 750 of each packet 745 to a modified address information and/or to recover the original address information 750 from the modified address information to. To facilitate recovery of the address information 750, the NAT rules 730 may be provided to (or negotiated with) the server-side appliance 200B in conjunction with the packets 745 (e.g., prior to, concurrent with, or subsequent to transmission of the packets 745). In some embodiments, the address mapper 715A may provide the association of the NAT rules 730 to the tunnels. In some embodiments, to transmit the NAT rules 730 to the server-side appliance 200B, the address mapper 715A may generate a packet to include the NAT rules 730 (e.g., in the payload). Once generated, the address mapper 715A may transmit the packet via one of the encrypted tunnels 740 to the server-side appliance 200B. In some embodiments, instead of a packet, a plurality of packets may be used to transmit the NAT rules 730 via the encrypted tunnel 740. The transmission over the encrypted tunnel 740 may be performed by the packet communicator 720A as detailed below. Upon receipt, the address mapper 715B running on the server-side appliance 200B may store and maintain the NAT rules 730 on the database 725B.

With the selection of one of the encrypted tunnel 735 or the unencrypted tunnel 740, the address mapper 715A may modify, convert, or translate the address information 750 of the packet 750 using at least one of the NAT rules 730. The NAT rules 730 may be used to obfuscate or mask the address information 750 included in each packet 745 communicated over the network 104' over one of the encrypted tunnels 735 or the unencrypted tunnels 740. In some embodiments, the address mapper 715A may identify or select the NAT rule 730 to apply to the address information 750 of the packets 750 based on the selection of the tunnel and/or based on the connection between the client 102 and the server 106. Once identified, the address mapper 715A may use the NAT rule 730 to translate the address information 750 of the packet 745, e.g., to specified address information. In accordance with the NAT rule 730, the initial source address of the address information 750 may be set to a specified source address. The initial source port of the address information 750 may be set to a specified source port. The initial destination address of the address information 750 may be set to a specified destination address. The initial destination port of the address information 750 may be set to a specified destination port. In some embodiments, the address mapper 715A may forego the translation using the NAT rule 730, e.g., when the handshake process is not successful, when an encryption algorithm to be applied to the packet 745 by the client/server is not confirmed, when the encryption algorithm to be applied to the packet 745 is determined to not satisfy the threshold, and/or when the packet 745 is to be send via an encrypted tunnel 735.

The packet communicator 720A executing on the client-side appliance 200B may communicate, transmit, or otherwise send the packet 745 through the selected tunnel (e.g., one of the encrypted tunnels 735 or the unencrypted tunnels 740). When the selected tunnel is one of the encrypted tunnels 735, the packet communicator 720A may apply the encryption algorithm specified by the encrypted tunnel 735 to the packet 745. The encryption algorithm may be applied to at least the body of the packet 745. Once applied, the packet communicator 720A may transmit the packet 745 via the encrypted tunnel 735 to the server-side appliance 200B. Conversely, when the selected tunnel is one of the unencrypted tunnels 740, the packet communicator 720A may transmit the packet 745 via the unencrypted tunnel 740. The packet communicator 720A may forego applying additional encryption algorithms to the packet 745, with the assumption that an encryption algorithm already applied to the packet 745 (e.g., determined via handshake or by the application running on the client 102) is sufficiently secure or strong.

The packet communicator 720B executing on the server-side appliance 200B may identify, intercept, or otherwise receive the packet 745 from the client-side appliance 200A via the selected tunnel. The packet 745 may have been communicated over the one of the encrypted tunnels 735 or the unencrypted tunnels 740. Upon receipt of the packet 745, the packet communicator 720B may identify via which tunnel the packet 745 is communicated. When the packet 745 is communicated via one of the unencrypted tunnels 740, the packet communicator 720B may identify the packet 745 as received via the unencrypted tunnel 740. The packet communicator 720B may forego applying additional encryption algorithms to decrypt the packet 745 at the server-side appliance 200B. When the packet 745 is communicated via one of the encrypted tunnels 735, the packet communicator 720B may identify the packet 745 as received via the encrypted tunnel 735. The packet communicator 720B may apply the encryption algorithm associated with the encrypted tunnel 735 to decrypt the packet 745 at the server-side appliance 200B. The encryption algorithm may be applied to at least the body of the packet 745 to recover the original payload.

In some embodiments, the connection handler 710B executing on the server-side appliance 200B may determine whether the encryption algorithm to be applied by the client (or application executing on the client) to the packet 745 satisfies a threshold. The threshold may demarcate a level of the encryption algorithm at which the resulting connection is considered to be sufficiently secure. The connection handler 710B may identify the encryption algorithm applied to the packet 745 based on the client 102 or the application executing on the client 102 that generated and transmitted the packet 745. In some embodiments, the determination may be based on a length of the block size generated from the application of the encryption algorithm, and/or the type of the encryption algorithm. In some embodiments, the determination may be based on a comparison of the identified encryption algorithm with a list of encryption algorithm pre-identified as secure. If the encryption algorithm applied to the packet 745 does not match with any on the list of encryption algorithms, the connection handler 710B may determine that the encryption algorithm to be applied does not satisfy the threshold. Conversely, if the encryption algorithm applied to the packet 745 matches at least one of the list of encryption algorithms, the connection handler 710B may determine that the encryption algorithm to be applied satisfies the threshold.

With the receipt of the packet 745, the address mapper 715B executing on the server-side appliance 200B may translate the address information 750 in the packet 745 using the NAT rule 730 to recover the original address information 750. The translation of the address information 750 may be performed when the packet 745 is identified as communicated via one of the unencrypted tunnels 740. In some embodiments, the translation of the address information 750 may be performed when the packet 745 is identified as communicated via a specific one of the encrypted tunnels 735 and the encryption algorithm applied to the packet 745 is determined to satisfy the threshold. Otherwise, when the packet 745 is identified as communicated via one of the encrypted tunnels 735 and the encryption algorithm applied by the client to the packet 745 is determined to not satisfy the threshold, the address mapper 715B may forego translation or recovery of the address information 750. The packet communicator 720B may also provide, deliver, or otherwise decrypt and then forward the packet 750 at the server-side appliance 200B without any NAT translation/reversal (e.g., de-NAT), to the to the server 106.

In translating, the address mapper 715B may identify the NAT rule 730 to apply to the address information 750 in the packet 745. The identification of the NAT rule 730 may be based on the tunnel (e.g., one of the encrypted tunnels 735 or the unencrypted tunnels 740). The identification of the NAT rule 730 may be based on the connection (or the identity of the connection) between the specific client 102 and the specific server 106. In some embodiments, upon identifying the NAT rule 730, the address mapper 715B may determine whether the NAT rule 730 is valid. The determination of validity of the NAT rule 730 may be based on the occurrence of the timeout event or the inactivity condition (e.g., as discussed above). For example, the address mapper 715B may monitor the connection for the last communicated packet, and may determine that the time elapsed between the last communicated packet and the current packet is within the threshold elapsed amount of time. In this example, based on the determination, the address mapper 715B may determine that the NAT rule 730 is still valid. When the occurrence of the timeout event or the inactivity condition is identified, the address mapper 715B may determine that the NAT rule 730 is no longer valid. The address mapper 715B may then forego the translation using the NAT rule 730 and may return a packet indicating an error back to the client-side appliance 200A. On other hand, when neither the occurrence of the timeout event nor the inactivity condition is identified, the address mapper 715B may determine that the NAT rule 730 is valid.

With the identification of the NAT rule 730, the address mapper 715B may translate (e.g., de-NAT, or reverse the client-side translation of) the address information 750 in the received packet 745 to recover the original address information 750. The translation of the address information 750 may be performed upon determining that the NAT rule 730 is valid. In accordance with the NAT rule 730, the modified source address of the address information 750 may be set to the original source address. The modified source port of the address information 750 may be set to the original source port. The modified destination address of the address information 750 may be set to the original destination address. The modified destination port of the address information 750 may be set to the original destination port. Upon translation, the packet communicator 720B may provide, deliver, or otherwise forward the packet 750 to the server 106 via the network 104".

The above-described functionality may be reversed, with the components of the server-side appliance 200B performing the operations of the components of the client-side appliance 200A and vice-versa. For example, the packet 745 may be generated and transmitted by one of the servers 106. The connection handler 710B of the server-side appliance 200B may parse the packet 745 and select one of the encrypted tunnels 735 or the unencrypted tunnels 740 based on the parsing. With the selection, the address mapper 715B may translate the address information 750 of the packet 745. Once translated, the packet communicator 720B may send the packet 745 over to the client-side appliance 200A via the selected tunnel. The packet communicator 720A in turn may receive the packet 745 from the server-side appliance 200B. The address mapper 715B may apply the ANT rule 730 to recover the original address information 750 and forward to the intended client 102.

By relying on the encryption performed by the client 102 or the server 106 on the packets 745, the appliances 200A and 200B may save for example around 50 to 100 bytes of additional encryption per each packet 745, in some embodiments. In this manner, the appliances 200A and 200B may reduce the consumption of computing resources from avoiding re-encryption (or stacking of layers of encryption) and the utilization of network bandwidth. As a result, the amount of latency from the transit of the packet 745 between the client 102 and the server 106 through the appliances 200A and 200B may be lessened.

Figure 8:
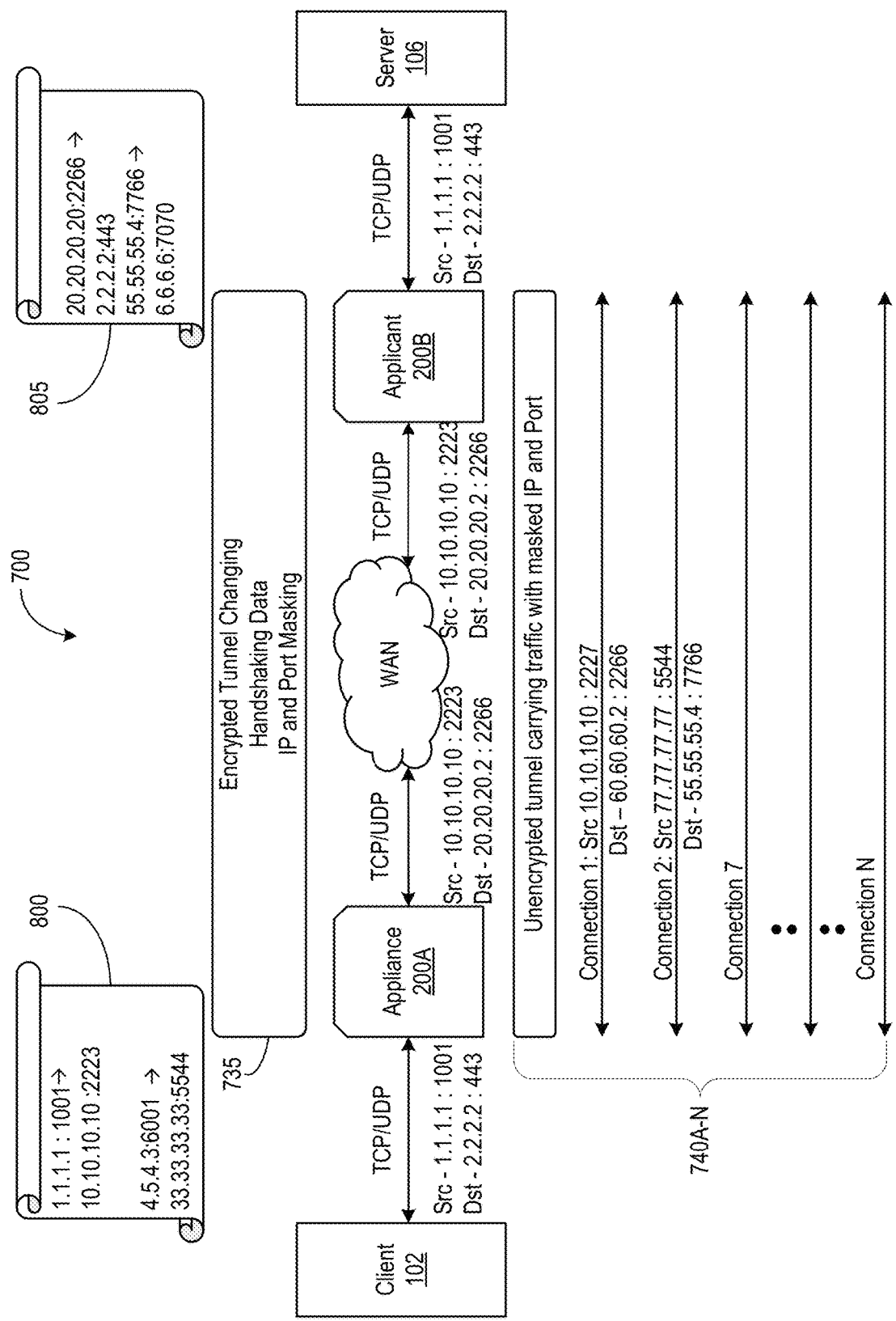
FIG. 8 is a communication diagram of an embodiment of a system for using unencrypted communicating tunnels in accordance with an illustrative embodiment.

Referring now to FIG. 8, depicted is a communication diagram of an example system 700 for using unencrypted communication tunnels. In the example depicted, the client 102 may communicate from a source Internet Protocol (IP) address and source port of "1.1.1.1:1001" with the server 106 at a destination IP address and destination port of "2.2.2.2:443." The client-side appliance 200 may determine that the cipher suite to be used in the connection is secure. In response to this determination, the client-side appliance 200A may select on the unencrypted tunnels 740 to transmit the packet. The client-side appliance 200A may also provide a NAT rule 800 or 850 with the server-side appliance 200B.

Using the NAT rule 800, the client-side appliance 200A may translate the source IP address and the source port from "1.1.1.1:1001" to "10.10.10.10:2223" and the destination IP address and destination port from "2.2.2.2:443" to "20.20.20.20:2266". Once translated, the client-side appliance 200A may send the packet via one of the unencrypted tunnels 740 to the server-side appliance 200B.

Figure 9A:
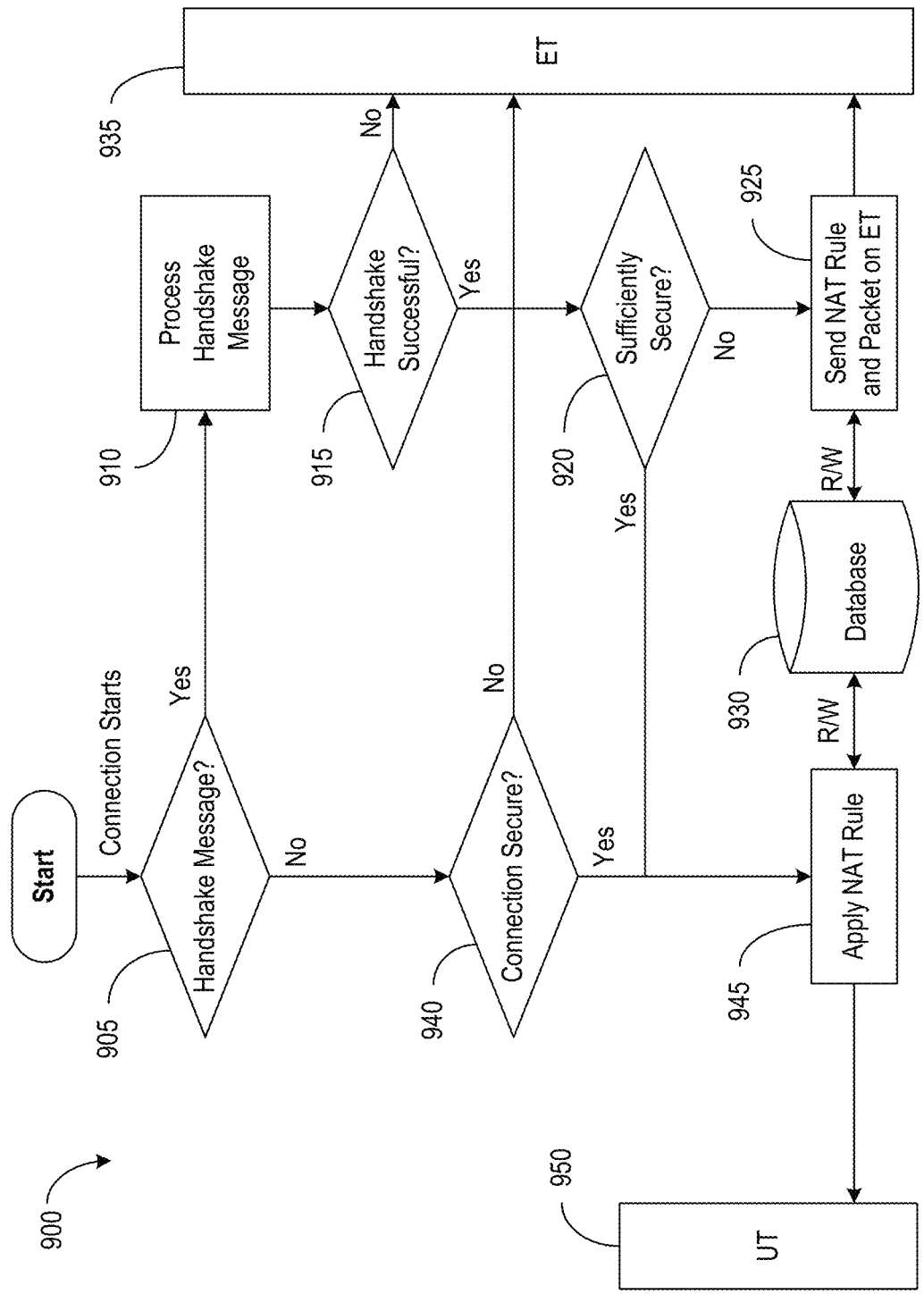
FIG. 9A is a process diagram of an embodiment of a method of selecting encrypted or unencrypted communicating tunnels to send packets in accordance with an illustrative embodiment.

Referring now to FIG. 9A, depicted is a process diagram of an example method 900 of selecting encrypted or unencrypted communicating tunnels to send packets. The method 900 may be implemented using, or performed by, the components described in conjunction with FIGS. 1-8, such as the appliance 200. In overview, the appliance (e.g., the client-side appliance 200A or the server-side appliance 200B) may determine whether a received packet (e.g., the packet 745) is a handshake message (900). If the packet is determined to be a handshake message, the appliance may process the handshake message (910). The appliance may determine whether the handshake is successful (915). If the handshake is determined to be successful, the appliance may determine whether the connection is sufficiently secure (920). If the connection is determined to be not sufficiently secure, the appliance may send a NAT rule (e.g., the NAT rule 730), apply the NAT rule on the packet, and send both NAT rule and the packet (925). The appliance may store the NAT rule on the database (e.g., the database 725A or 725B) (930). The appliance may select one of the encrypted tunnels (e.g., the encrypted tunnel 735) (935). The selection of the encrypted tunnel may also be in response to determining that the handshake is not successful or that encryption by the client/server cannot be ascertained or is insufficiently strong/secure. When the received packet is determined to be not a handshake message, the appliance may determine whether the connection is sufficiently secure (940). When the connection is determined to be not sufficiently secure, the appliance may select one of the encrypted tunnels (935). Otherwise, when the connection is determined to be sufficiently secure (as determined in (920) or (940)), the appliance may apply the NAT rule to the packet (945). The appliance may store the NAT rule on the database (930), and may also select one of the unencrypted tunnels (e.g., the unencrypted tunnel 740) (950) to transmit packets.

Figure 9B:
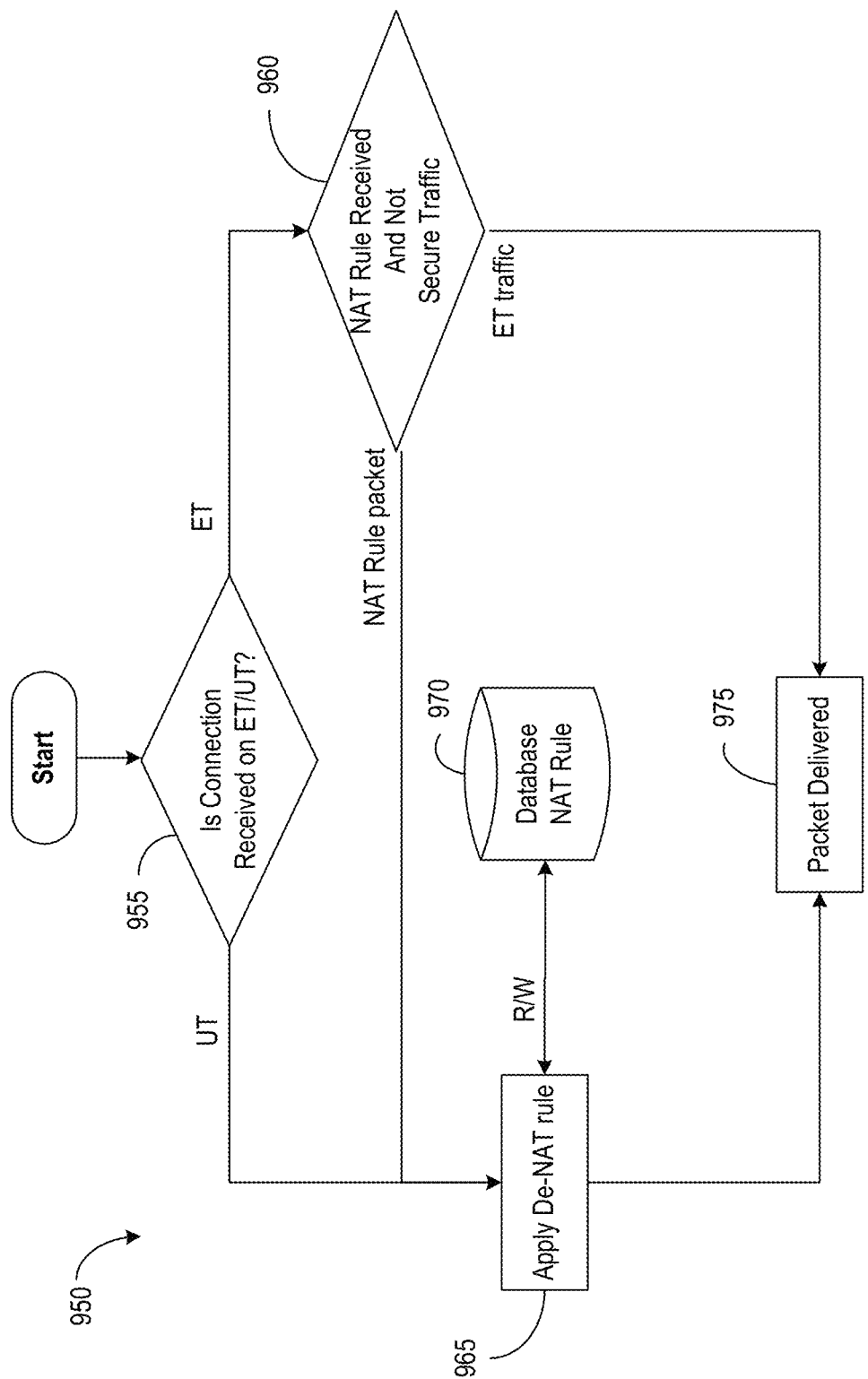
FIG. 9B is a process diagram of an embodiment of a method of processing packets received via encrypted or unencrypted communicating tunnels in accordance with an illustrative embodiment.

Referring now to FIG. 9B, depicted is a process diagram of a method 950 of processing packets received via encrypted tunnels (ETs) or unencrypted tunnels (UTs). The method 950 may be implemented using, or performed by, the components described in conjunction with FIGS. 1-8, such as the appliance 200. In overview, an appliance (e.g., the client-side appliance 200A or the server-side appliance 200B) may determine whether a packet (e.g., the packet 745) is transmitted on an encrypted tunnel (e.g., the encrypted tunnel 735) or an unencrypted tunnel (e.g., the unencrypted tunnel 740) (955). When determined to be the encrypted tunnel, the appliance may determine whether the NAT rule is received and whether the traffic is secure between the client and server (960). When a NAT rule is received and the traffic is determined to be secure, the appliance may apply the NAT rule to recover the address information (965). The NAT rule may be applied when the packet is received via the unencrypted tunnel. The appliance may also identify the NAT rule from a database (e.g., the database 725A or 725B) (970). Otherwise, when the NAT rule is not received and the traffic is determined to be not secure, the appliance may deliver the packet via an encrypted tunnel (975).

Figure 10:
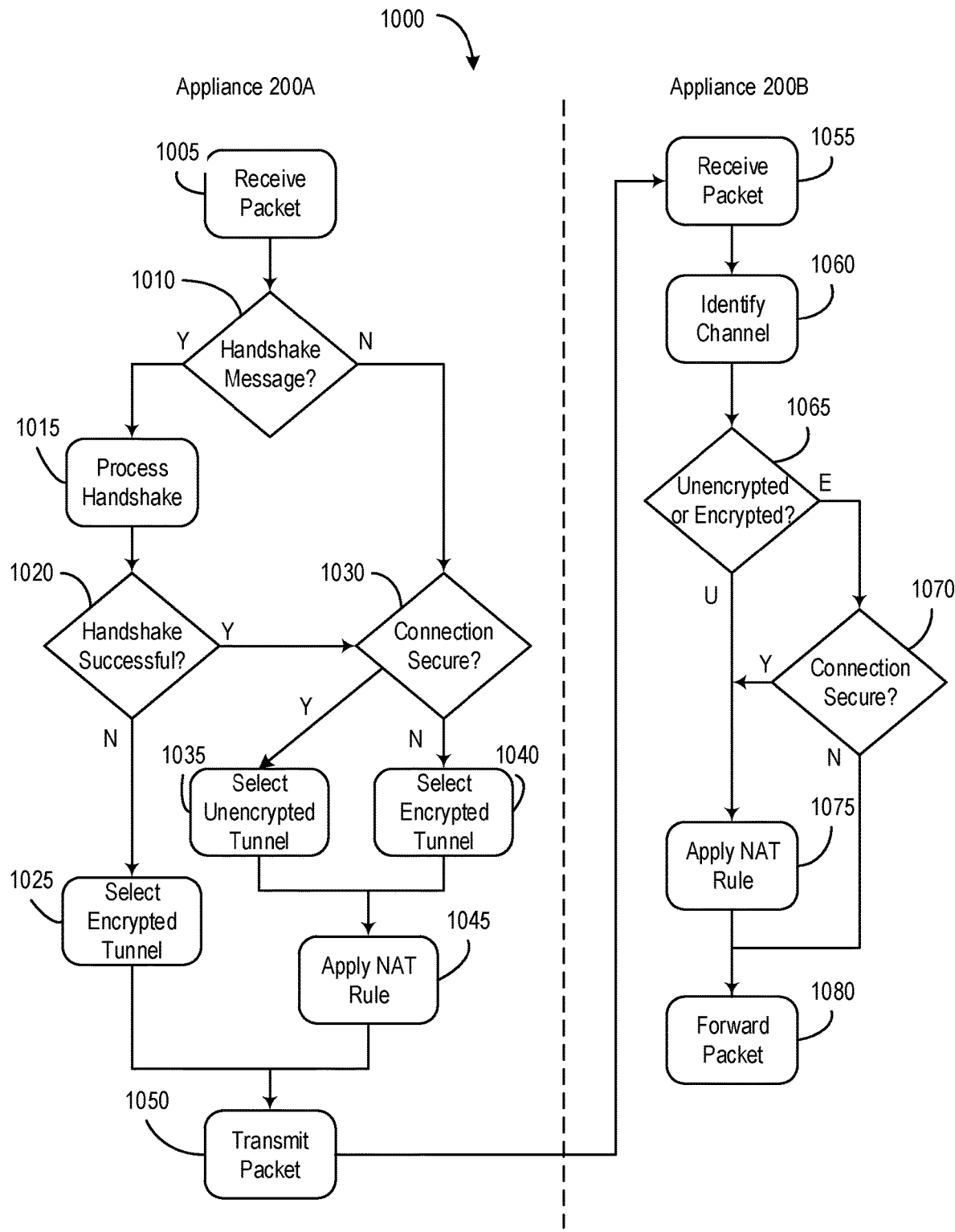
FIG. 10 is a flow diagram of an embodiment of a method of using unencrypted communicating tunnels in accordance with an illustrative embodiment.

Referring now to FIG. 10, depicted is a flow diagram for a method 1000 of using unencrypted communication tunnels. The functionalities of method 1000 may be implemented using, or performed by, the components described in conjunction with FIGS. 1-8, such as the appliance 200. In brief overview, a first appliance (or device intermediary between a client and a server) may receive a packet (1005). The first appliance may determine whether the packet is a handshake message (1010). If the packet is determined to be the handshake message, the first appliance may process the handshake (1015). The first appliance may determine whether the handshake is successful (1020). If the handshake is determined to be unsuccessful, the first appliance may select an encrypted tunnel (1025). If the packet is determined to be not a handshake message or the handshake is determined to be successful, the first appliance may determine whether the connection is secure, e.g., between the client and the server (1030). If the connection is determined to be secure, the first appliance may select an unencrypted tunnel (1035). On the other hand, if the connection is determined to be not secure, the first appliance may select an encrypted tunnel (1040). The first appliance may apply a network address translation (NAT) rule (1045). The first appliance may transmit the packet (1050). A second appliance may in turn receive the packet (1055). The second appliance may identify a channel/tunnel (1060). The second appliance may determine whether the identified channel/tunnel is unencrypted or encrypted (1065). If the channel/tunnel is determined to encrypted, the second appliance may determine whether the connection is secure (1070). If the identified channel is unencrypted or the connection is determined to be secure, the second appliance may apply the NAT rule (1075). The second appliance may forward the packet (1080).

In further detail, a first appliance (e.g., the client-side appliance 200A, or first device) may receive a packet (e.g., the packet 745) (1005). The packet may be received from a client (e.g., the client 102) to be communicated with a server (e.g., the server 106). The packet may include a header and a body. The packet may also include address information (e.g., the address information 750) in the header or the body, or both. The address information may include a source address, a source port, a destination address, and a destination port, among others.

The first appliance may determine whether the packet is a handshake message (1010). The packet may be a handshake message to establish a connection between the client and the server. To determine whether the packet is a handshake message, the first appliance may parse the packet to identify the contents. When the contents correspond to those of a handshake message, the first appliance may determine that the packet is a handshake message. Conversely, when the contents corresponding to a handshake message are lacking, the first appliance may determine that the packet is not a handshake message.

If the packet is determined to be the handshake message, the first appliance may process the handshake (1015). The first appliance may facilitate or process the handshake in accordance to a handshake protocol as specified in the handshake message. The first appliance may determine whether the handshake is successful (1020). While processing the handshake, the first appliance may monitor packet(s) exchanged as part of the handshake protocol. By monitoring and parsing the packet(s), the first appliance may identify an error condition. When the error condition is identified, the first appliance may determine that the handshake is not successful (e.g., that encryption is not successfully negotiated between the client and the server). Otherwise, upon receipt of a handshake completion message, the first appliance may determine that the handshake is successful. If the handshake is determined to be unsuccessful, the first appliance may select an encrypted tunnel (e.g., the encrypted tunnel 735) (1025).

If the packet is determined to be not a handshake message or the handshake is determined to be successful, the first appliance may determine whether the connection is secure (1030). For example, the first appliance may parse the handshake message to identify an encryption algorithm to be applied to the payload of the packet. The first appliance may also identify the encryption algorithm from an originating application as identified in the header of the packet. With the identification, the first appliance may compare the encryption algorithm with one of a list of encryption algorithm identified as secure. When the encryption algorithm matches with one on the list, the first appliance may determine that the connection is secure. Otherwise, when the encryption algorithm does not match with any on the list, the first appliance may determine that the connection is not secure.

If the connection is determined to be secure, the first appliance may select an unencrypted tunnel (e.g., the unencrypted tunnel 740) (1035). On the other hand, if the connection is determined to be not secure, the first appliance may selected an encrypted tunnel (1040). The first appliance may apply a network address translation (NAT) rule (e.g., the NAT rule 730) (1045). The NAT rule may define or specify a mapping between: an initial source address to a modified source address; an initial source port to a modified source port; an initial destination address to a modified destination address; and an initial destination port to a modified destination port, among others. The NAT rule may be particular to a specific connection between the client and the server. Using the NAT rule, the first appliance may translate the address information in the packet. The first appliance may transmit the packet (1050).

A second appliance may in turn receive the packet (1055). The packet may be communicated over a network (e.g., the network 104') between the first appliance and the second appliance. The second appliance (e.g., the server-side appliance 200B) may identify a channel (1060). The channel may correspond to the tunnel from which the packet is received, and may be one of the encrypted tunnels or the unencrypted tunnels. When the packet is received via the encrypted tunnel, the second appliance may identify the encrypted tunnel as communicating the packet. When the packet is received via the unencrypted tunnel, the second appliance may identify the unencrypted tunnel as communicating the packet. The second appliance may determine whether the identified channel is unencrypted or encrypted (1065).

If the channel is determined to encrypted, the second appliance may determine whether the connection is secure (1070). The second appliance may identify the encryption algorithm applied to the packet from the packet itself or the originating appliance. With the identification, the second appliance may compare the encryption algorithm with one of a list of encryption algorithm identified as secure. When the encryption algorithm matches with one on the list, the second appliance may determine that the connection is secure. Otherwise, when the encryption algorithm does not match with any on the list, the second appliance may determine that the connection is not secure.

If the identified channel is unencrypted and/or the connection is determined to be secure, the second appliance may apply the NAT rule (1075). The NAT rule applied by the second appliance may be provided by the first appliance. The provision of the NAT rule may be in conjunction with the transmission of the packet. Using the NAT rule, the first appliance may translate the address information in the packet to recover the original address information. The second appliance may forward the packet to the server or intended destination of the packet (1080).

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method comprising:
   maintaining, by a first device intermediary between a client and a server, an encrypted tunnel and an unencrypted tunnel with a second device intermediary between the client and the server;
   communicating, by the first device with the second device, at least one network address translation (NAT) rule via the encrypted tunnel;
   translating, by the first device, address information of a first packet using the at least one NAT rule, responsive to an encryption applied to a payload of the first packet satisfying a threshold; and
   sending, by the first device, the first packet with the translated address information via the unencrypted tunnel, to the second device to reverse the translation of the address information using the at least one NAT rule.

2. The method of claim 1, comprising establishing, by the first device, the encrypted tunnel and the unencrypted tunnel with the second device.

3. The method of claim 1, comprising:
   receiving, by the first device, a handshake message from the client or the server for establishing a connection to communicate at least the first packet between the client and the server;
   determining, by the first device according to information from the handshake message, that the encryption applied by the client or the server on at least the payload of the first packet satisfies the threshold; and
   sending, by the first device responsive to the determining, the first packet via the unencrypted tunnel to the second device.

4. The method of claim 1, comprising:
   receiving, by the first device, a handshake message from the client or the server for establishing a connection between the client and the server; and
   sending, by the first device, the handshake message to the second device via the encrypted tunnel.

5. The method of claim 1, wherein communicating the at least one NAT rule via the encrypted tunnel comprises:
   encrypting, by the first device, the at least one NAT rule prior to sending to the second device; and
   causing the second device to decrypt the encrypted at least one NAT rule.

6. The method of claim 1, wherein the address information of the first packet comprises at least one of a source address, a source port, a destination address, or a destination port.

7. The method of claim 1, comprising maintaining, by at least the first device, the at least one NAT rule until a timeout event or a connection between the client and the server becomes inactive.

8. The method of claim 1, comprising communicating, by the first device with the second device, a plurality of NAT rules for a plurality of connections between at least the client and at least the server, in a packet via the encrypted tunnel.

9. A first device, comprising:
   at least one processor that is intermediary between a client and a server, the at least one processor configured to:
      maintain an encrypted tunnel and an unencrypted tunnel with a second device intermediary between the client and the server;
      communicate, with the second device, at least one network address translation (NAT) rule via the encrypted tunnel;
      translate address information of a first packet, using the at least one NAT rule, responsive to an encryption applied to a payload of the first packet satisfying a threshold; and
      send the first packet with the translated address information via the unencrypted tunnel, to the second device to reverse the translation of the address information using the at least one NAT rule.

10. The first device of claim 9, wherein the at least one processor is configured to establish the encrypted tunnel and the unencrypted tunnel with the second device.

11. The first device of claim 9, wherein the at least one processor is configured to:
    receive a handshake message from the client or the server for establishing a connection to communicate at least the first packet between the client and the server;
    determine, according to information from the handshake message, that the encryption applied by the client or the server on at least the payload of the first packet satisfies the threshold; and
    send, responsive to the determination, the first packet via the unencrypted tunnel to the second device.

12. The first device of claim 9, wherein the at least one processor is configured to:
    receive a handshake message from the client or the server for establishing a connection between the client and the server; and
    send the handshake message to the second device via the encrypted tunnel.

13. The first device of claim 9, wherein the at least one processor is configured to communicate the at least one NAT rule via the encrypted tunnel by:
    encrypting the at least one NAT rule prior to sending to the second device; and
    causing the second device to decrypt the encrypted at least one NAT rule.

14. The first device of claim 9, wherein the address information of the first packet comprises at least one of a source address, a source port, a destination address, or a destination port.

15. The first device of claim 9, wherein the at least one processor is configured to maintain the at least one NAT rule until a timeout event or a connection between the client and the server becomes inactive.

16. The first device of claim 9, wherein the at least one processor is configured to communicate, with the second device, a plurality of NAT rules for a plurality of connections between at least the client and at least the server, in a packet via the encrypted tunnel.

17. A non-transitory computer readable medium storing program instructions for causing at least one processor to:
    maintain an encrypted tunnel and an unencrypted tunnel with a second device intermediary between a client and a server, the at least one processor residing in a first device intermediary between the client and the server;
    communicate, with the second device, at least one network address translation (NAT) rule via the encrypted tunnel;
    translate address information of a first packet, using the at least one NAT rule, responsive to an encryption applied to a payload of the first packet satisfying a threshold; and
    send the first packet with the translated address information via the unencrypted tunnel to the second device to reverse the translation of the address information at the second device using the at least one NAT rule.

18. The non-transitory computer readable medium of claim 17, wherein the program instructions cause the at least one processor to:
- receive a handshake message from the client or the server for establishing a connection to communicate at least the first packet between the client and the server;
- determine, according to information from the handshake message, that the encryption applied by the client or the server on at least the payload of the first packet satisfies the threshold, and
- send, responsive to the determination, the first packet via the unencrypted tunnel to the second device.

19. The non-transitory computer readable medium of claim 17, wherein the program instructions cause the at least one processor to:
- receive a handshake message from the client or the server for establishing a connection between the client and the server; and
- send the handshake message to the second device via the encrypted tunnel.

20. The non-transitory computer readable medium of claim 17, wherein the program instructions cause the at least one processor to communicate the at least one NAT rule via the encrypted tunnel by:
- encrypting the at least one NAT rule prior to sending to the second device; and
- causing the second device to decrypt the encrypted at least one NAT rule.

* * * * *